US012587632B2

(12) United States Patent
Li et al.

(10) Patent No.: US 12,587,632 B2
(45) Date of Patent: Mar. 24, 2026

(54) DISPLAY METHOD

(71) Applicant: BOE TECHNOLOGY GROUP CO., LTD., Beijing (CN)

(72) Inventors: Wenyu Li, Beijing (CN); Lili Chen, Beijing (CN); Jinghua Miao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/923,831

(22) Filed: Oct. 23, 2024

(65) Prior Publication Data

US 2025/0047830 A1 Feb. 6, 2025

Related U.S. Application Data

(63) Continuation-in-part of application No. 18/294,691, filed as application No. PCT/CN2023/077088 on Feb. 20, 2023.

(51) Int. Cl.
H04N 13/00 (2018.01)
H04N 13/128 (2018.01)
(Continued)

(52) U.S. Cl.
CPC ......... H04N 13/383 (2018.05); H04N 13/156 (2018.05); H04N 13/398 (2018.05);
(Continued)

(58) Field of Classification Search
CPC .. H04N 13/383; H04N 13/156; H04N 13/398; H04N 2013/0077; H04N 2013/0081
(Continued)

(56) References Cited

U.S. PATENT DOCUMENTS 12,363,309 B2 * 7/2025 Otsuka ................ H04N 19/172
2010/0103249 A1 * 4/2010 Lipton ................ H04N 13/178
348/51
(Continued)

FOREIGN PATENT DOCUMENTS

CN 101866057 A 10/2010
CN 104317120 A * 1/2015 ....... G02F 1/133528
(Continued)

OTHER PUBLICATIONS

Non-final Office Action corresponding to U.S. Appl. No. 18/294,691 (mailed Oct. 22, 2025).

*Primary Examiner* — Albert Kir
(74) *Attorney, Agent, or Firm* — Myers Bigel, P.A.

(57) ABSTRACT

The present application proposes a display method, including determining a current display mode of a display at a display end, wherein the current display mode is one of at least two display modes, and each mode indicates definition information related to resolution of an image to be displayed, obtaining multiple current frame color images of a scene through multiple image acquisition devices at the acquisition end, determining current frame depth maps at the locations of at least three image acquisition devices, so as to obtain current frame depth information for the scene, generating left-eye and right-eye viewpoint maps corresponding to human eye positioning coordinate data based on the current frame depth information, the current frame color images obtained through the at least three image acquisition devices and the human eye positioning coordinate data, and synthesizing the generated left-eye viewpoint map and the right-eye viewpoint map into a three-dimensional image.

18 Claims, 13 Drawing Sheets

(51) Int. Cl.
    *H04N 13/156*     (2018.01)
    *H04N 13/383*     (2018.01)
    *H04N 13/398*     (2018.01)

(52) U.S. Cl.
    CPC ................ *H04N 2013/0077* (2013.01); *H04N 2013/0081* (2013.01)

(58) Field of Classification Search
    USPC ........................................................ 348/51
    See application file for complete search history.

(56)                  References Cited

U.S. PATENT DOCUMENTS

| | | | |
|---|---|---|---|
| 2011/0249087 A1* | 10/2011 | Tsang ................... | G03H 1/2294 348/40 |
| 2013/0314406 A1 | 11/2013 | Lin | |
| 2015/0227112 A1 | 8/2015 | Liu et al. | |
| 2017/0147866 A1 | 5/2017 | Tokui et al. | |
| 2018/0270463 A1 | 9/2018 | Sou et al. | |
| 2019/0124313 A1 | 4/2019 | Li et al. | |
| 2021/0352323 A1* | 11/2021 | Sugio ..................... | H04N 19/85 |
| 2022/0413433 A1 | 12/2022 | Parra Pozo et al. | |

FOREIGN PATENT DOCUMENTS

| | | | |
|---|---|---|---|
| CN | 105425409 A | 3/2016 | |
| CN | 107315470 A | 11/2017 | |
| CN | 107562185 A | 1/2018 | |
| CN | 108885409 A | 11/2018 | |
| CN | 113382226 A | 9/2021 | |
| CN | 113382227 A | 9/2021 | |

* cited by examiner

300

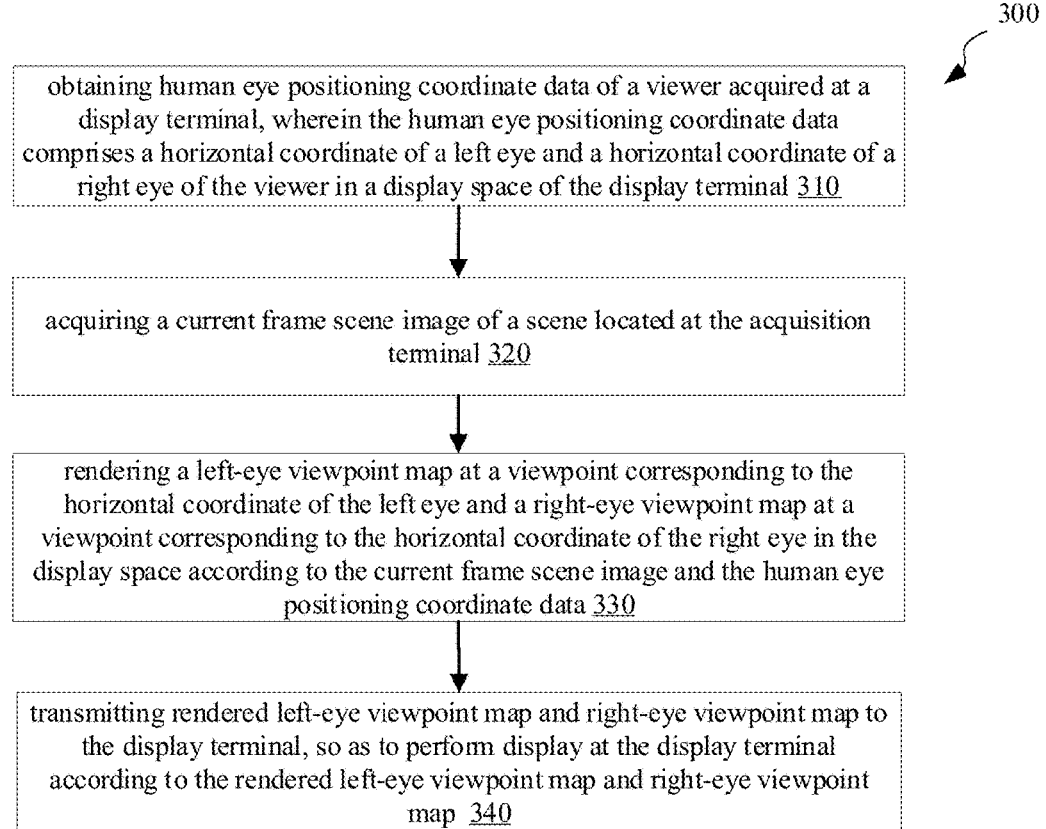

obtaining human eye positioning coordinate data of a viewer acquired at a display terminal, wherein the human eye positioning coordinate data comprises a horizontal coordinate of a left eye and a horizontal coordinate of a right eye of the viewer in a display space of the display terminal 310 acquiring a current frame scene image of a scene located at the acquisition terminal 320 rendering a left-eye viewpoint map at a viewpoint corresponding to the horizontal coordinate of the left eye and a right-eye viewpoint map at a viewpoint corresponding to the horizontal coordinate of the right eye in the display space according to the current frame scene image and the human eye positioning coordinate data 330 transmitting rendered left-eye viewpoint map and right-eye viewpoint map to the display terminal, so as to perform display at the display terminal according to the rendered left-eye viewpoint map and right-eye viewpoint map 340

FIG. 3

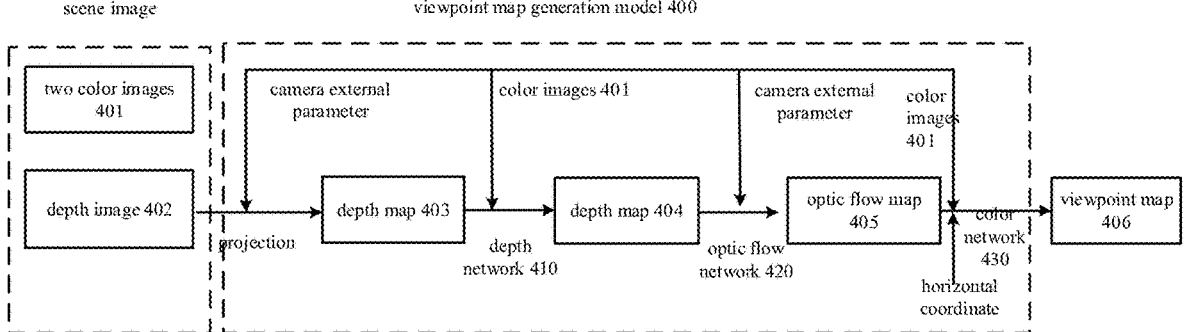

FIG. 4

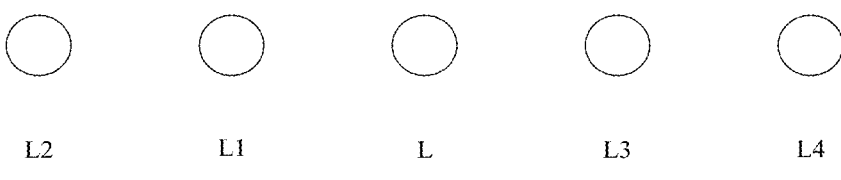

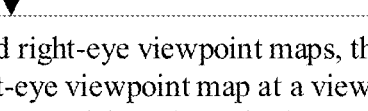
acquiring human eye positioning coordinate data of a viewer located at a display terminal, wherein the human eye positioning coordinate data comprises a horizontal coordinate of a left eye and a horizontal coordinate of a right eye of the viewer in a display space of the display terminal 610 transmitting the human eye positioning coordinate data to an acquisition terminal 620 obtaining left-eye viewpoint maps and right-eye viewpoint maps, the left-eye viewpoint maps comprising a left-eye viewpoint map at a viewpoint corresponding to the horizontal coordinate of the left eye in the display space, which is rendered by the acquisition terminal according to a current frame scene image acquired by the acquisition terminal and the human eye positioning coordinate data, the right-eye viewpoint maps comprising a right-eye viewpoint map at a viewpoint corresponding to the horizontal coordinate of the right eye in the display space, which is rendered by the acquisition terminal according to the current frame scene image acquired by the acquisition terminal and the human eye positioning coordinate data 630 performing display according to the obtained left-eye viewpoint maps and right-eye viewpoint maps 640

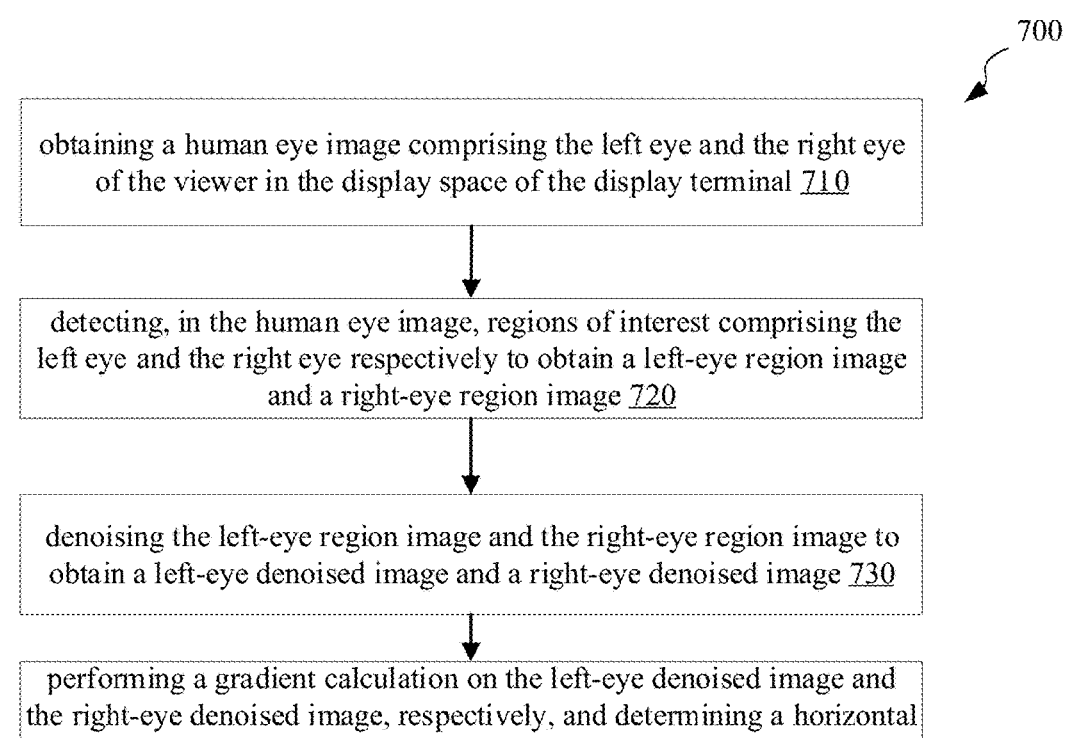

obtaining a human eye image comprising the left eye and the right eye of the viewer in the display space of the display terminal 710 detecting, in the human eye image, regions of interest comprising the left eye and the right eye respectively to obtain a left-eye region image and a right-eye region image 720 denoising the left-eye region image and the right-eye region image to obtain a left-eye denoised image and a right-eye denoised image 730 performing a gradient calculation on the left-eye denoised image and the right-eye denoised image, respectively, and determining a horizontal coordinate of a point with a largest number of straight line intersections in a gradient direction in a respective denoised image of the left-eye denoised image and the right-eye denoised image as a horizontal coordinate of an eye of the viewer in a respective direction 740

FIG. 7

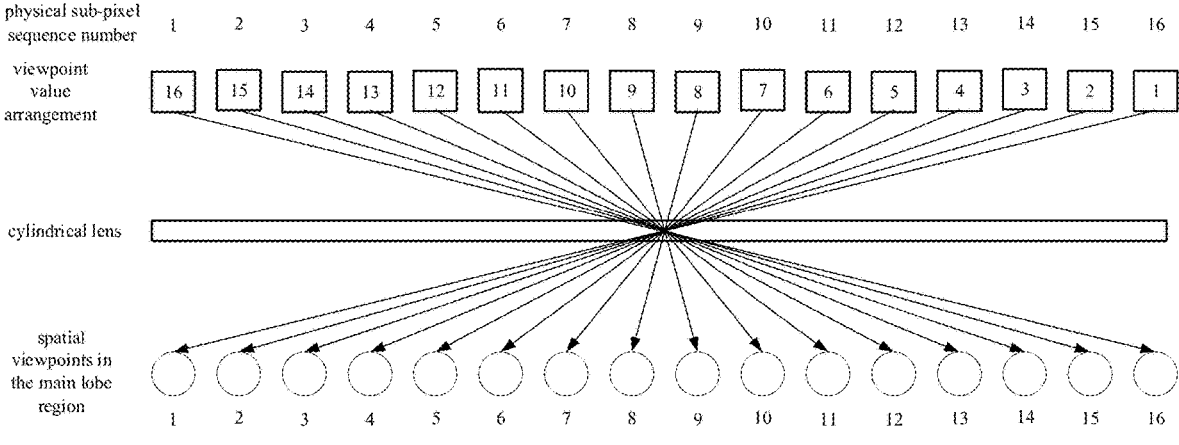

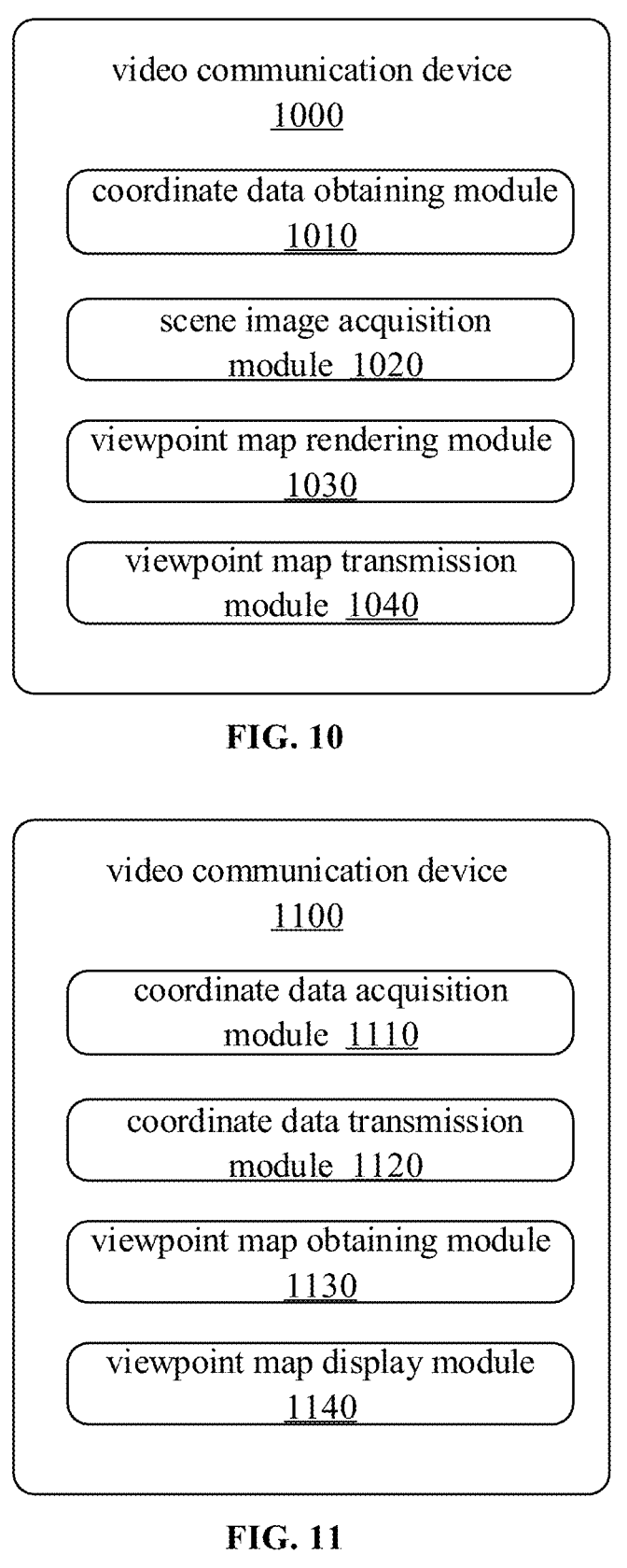

FIG. 8A video communication device
1000 coordinate data obtaining module
1010 scene image acquisition
module 1020 viewpoint map rendering module
1030 viewpoint map transmission
module 1040

FIG. 10 video communication device
1100 coordinate data acquisition
module 1110 coordinate data transmission
module 1120 viewpoint map obtaining module
1130 viewpoint map display module
1140

FIG. 11

Figure 12:
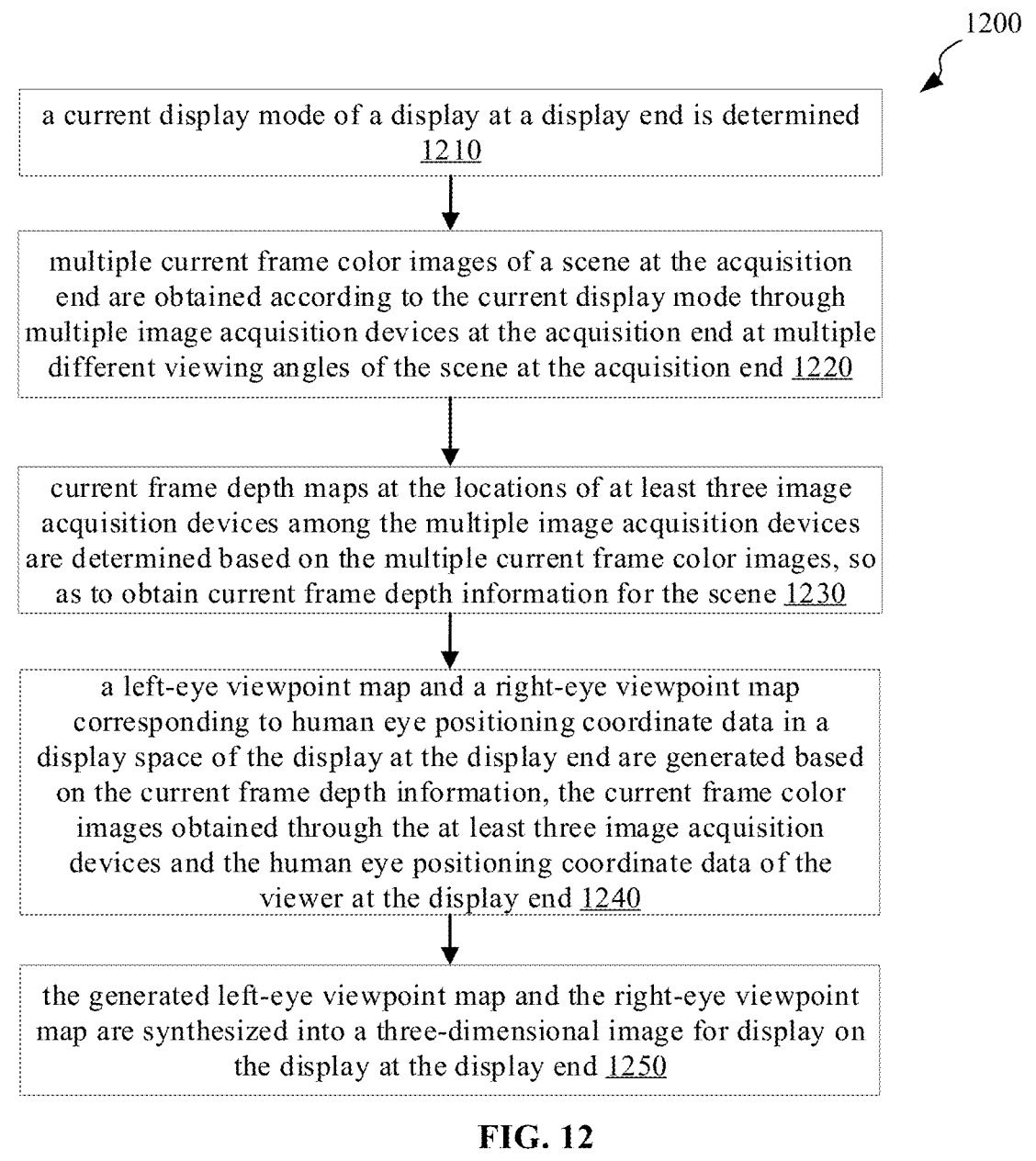

1200 a current display mode of a display at a display end is determined
1210 multiple current frame color images of a scene at the acquisition
end are obtained according to the current display mode through
multiple image acquisition devices at the acquisition end at multiple
different viewing angles of the scene at the acquisition end 1220 current frame depth maps at the locations of at least three image
acquisition devices among the multiple image acquisition devices
are determined based on the multiple current frame color images, so
as to obtain current frame depth information for the scene 1230 a left-eye viewpoint map and a right-eye viewpoint map
corresponding to human eye positioning coordinate data in a
display space of the display at the display end are generated based
on the current frame depth information, the current frame color
images obtained through the at least three image acquisition
devices and the human eye positioning coordinate data of the
viewer at the display end 1240 the generated left-eye viewpoint map and the right-eye viewpoint
map are synthesized into a three-dimensional image for display on
the display at the display end 1250

FIG. 12 display mode selection

| full HD mode 1301 | high-low definition mode 1302 | full low definition mode 1303 | default mode 1304 | high-low definition display mode

| first high-low definition display mode 1401 | second high-low definition display mode 1402 | third high-low definition display mode 1403 | default high-low definition display mode 1404 | full definition display mode

| 1 | 2 | 3 |
| 4 | 5 | N |

2100

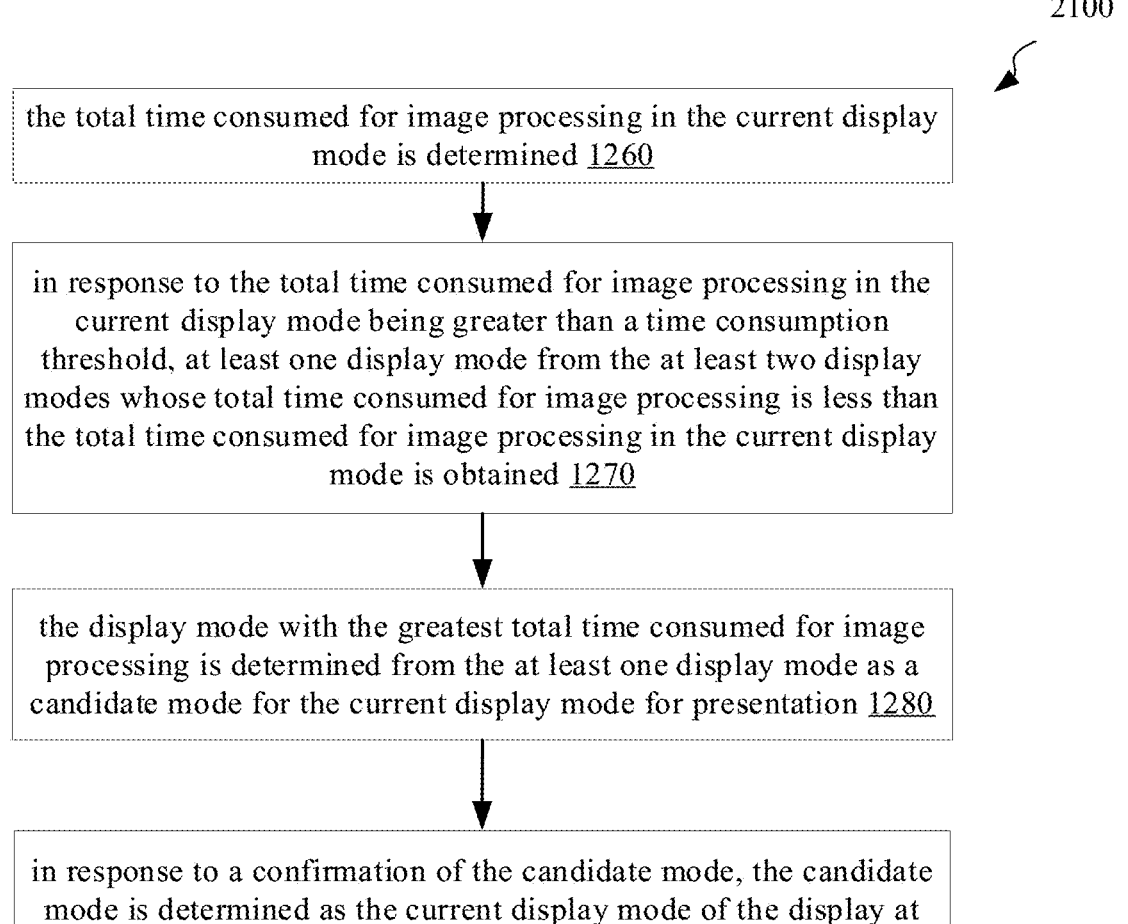

the total time consumed for image processing in the current display mode is determined 1260 in response to the total time consumed for image processing in the current display mode being greater than a time consumption threshold, at least one display mode from the at least two display modes whose total time consumed for image processing is less than the total time consumed for image processing in the current display mode is obtained 1270 the display mode with the greatest total time consumed for image processing is determined from the at least one display mode as a candidate mode for the current display mode for presentation 1280 in response to a confirmation of the candidate mode, the candidate mode is determined as the current display mode of the display at the display end 1290

FIG. 21

The current display mode is not suitable, it is recommended to use a candidate mode...

FIG. 22

DISPLAY METHOD

RELATED REFERENCE

The present application is a continuation-in-part application of U.S. patent application Ser. No. 18/294,691, filed Feb. 2, 2024, which is a 35 U.S.C. 371 national stage application of PCT International Application No. PCT/CN2023/077088 filed on Feb. 20, 2023, the entire disclosures of which are incorporated herein by reference.

FIELD

The present disclosure relates to the technical field of video communication, in particular to a display method, a computing device, a computer storage medium, and a computer program product.

BACKGROUND

In recent years, with the rapid development of 3D (3 dimensions) display technology, especially the rapid progress in naked-eye 3D display technology, 3D display technology has been widely adopted in global video conferences. Due to the strong immersively interactive experience of 3D remote one-on-one video communication, it can be foreseen as the mainstream communication method in the future.

For such a video communication system, a large number of cameras are generally used at an acquisition end to capture multi-angle data of the scene located in front of the screen at the acquisition end, in order to serve as the source data for later 3D image information synthesis. Then, the acquired source data is hardware encoded and the encoded data is pushed to the network for streaming transmission. The display end obtains the encoded data from the network for decoding, and renders the decoded data into an image with a fixed resolution. The resolution of the rendered image is suitable for display on the display at the display end. However, due to the large number of cameras and the fixed display mode of the display at the display end, a performance of the processor executing image processing may be insufficient, which can lead to increased end-to-end delay in the video communication system. Images cannot be displayed normally or may experience lag or frame loss in the display mode, directly affecting the efficiency and experience of 3D video calls.

SUMMARY

In view of this, the present disclosure provides a display method, a computing device, a computer storage medium, and a computer program product.

According to a first aspect of the present disclosure, there is provided a display method, comprising: determining a current display mode of a display at a display end, wherein the current display mode is one of at least two display modes of the display, and each of the at least two display modes indicates definition information related to resolution of an image to be displayed on the display at the display end; obtaining multiple current frame color images of a scene at the acquisition end according to the current display mode through multiple image acquisition devices at the acquisition end at multiple different viewing angles of the scene at the acquisition end; determining current frame depth maps at the locations of at least three image acquisition devices among the multiple image acquisition devices based on the multiple current frame color images, so as to obtain current frame depth information for the scene; generating a left-eye viewpoint map and a right-eye viewpoint map corresponding to human eye positioning coordinate data in a display space of the display at the display end based on the current frame depth information, the current frame color images obtained through the at least three image acquisition devices and the human eye positioning coordinate data of the viewer at the display end, wherein the human eye positioning coordinate data comprises the coordinates of the left eye and the right eye of the viewer in the display space at the display end; synthesizing the generated left-eye viewpoint map and the right-eye viewpoint map into a three-dimensional image for display on the display at the display end.

In some embodiments, each of the at least two display modes comprises one of a full definition display mode and a high-low definition display mode; wherein, in the full definition display mode, each frame image displayed on the display at the display end has full definition resolution in the entire image region, and in the high-low definition display mode, each frame image displayed on the display at the display end comprises a first image region with high resolution and a second image region with low resolution; and wherein, in the case where there are at least two full definition display modes, the full definition resolutions in the at least two full definition display modes are different from each other; in the case where there are at least two high-low definition display modes, the resolution group consisting of high resolution and low resolution in each high-low definition display mode is different from the resolution group consisting of high resolution and low resolution in each of the at least one other high-low definition display mode.

In some embodiments, the current display mode is a full definition display mode; and wherein, obtaining multiple current frame color images of a scene at the acquisition end according to the current display mode through multiple image acquisition devices at the acquisition end at multiple different viewing angles of the scene at the acquisition end comprises: obtaining the multiple current frame color images with the full definition resolution at the multiple different viewing angles through the multiple image acquisition devices at the acquisition end.

In some embodiments, the current display mode is a high-low definition display mode; and wherein, obtaining multiple current frame color images of a scene at the acquisition end according to the current display mode through multiple image acquisition devices at the acquisition end at multiple different viewing angles of the scene at the acquisition end comprises: for each of the multiple different perspectives, obtaining a region image with the high resolution and a color image with the low resolution for the current frame through a respective image acquisition device among the multiple image acquisition devices at the acquisition end as a current frame color image, wherein a corresponding position of the region image with the high resolution in the color image with the low resolution is the same as a corresponding position of the first image region in said each frame image.

In some embodiments, said obtaining a region image with the high resolution and a color image with the low resolution for the current frame through a respective image acquisition device among the multiple image acquisition devices at the acquisition end comprises: obtaining the color image with the high resolution through the respective image acquisition device among the multiple image acquisition devices at the acquisition end; obtaining the region image with the high resolution and the color image with the low resolution based on the color image with the high resolution.

In some embodiments, said determining current frame depth maps at the locations of at least three image acquisition devices among the multiple image acquisition devices based on the multiple current frame color images, so as to obtain current frame depth information for the scene, comprises: determining at least three first depth maps for the regional images with the high resolution and at least three second depth maps for the color images with the low resolution at the locations of at least three of the multiple image acquisition devices according to the regional images with the high resolution and the color images with the low resolution in the multiple current frame color images, respectively; determining the first depth information for the regional images with the high resolution and the second depth information for the color images with the low resolution according to the at least three first depth maps and the at least three second depth maps, respectively, as the current frame depth information for the scene.

In some embodiments, said generating a left-eye viewpoint map and a right-eye viewpoint map corresponding to human eye positioning coordinate data in a display space of the display at the display end based on the current frame depth information, the current frame color images obtained by the at least three image acquisition devices and the human eye positioning coordinate data of the viewer at the display end comprises: generating a left-eye viewpoint map and a right-eye viewpoint map with the high resolution corresponding to the eye positioning coordinate data in the display space based on the first depth information, the regional images with high-resolution obtained through the at least three image acquisition devices, and the eye positioning coordinate data of the viewer at the display end; generating a left-eye viewpoint map and a right-eye viewpoint map with the low resolution corresponding to the eye positioning coordinate data in the display space based on the second depth information, the color images with the low resolution obtained through the at least three image acquisition devices, and the eye positioning coordinate data of the viewer at the display end.

In some embodiments, said synthesizing the generated left-eye viewpoint map and the right-eye viewpoint map into a three-dimensional image for display on the display at the display end comprises: synthesizing the left-eye viewpoint map and right-eye viewpoint map with the high resolution, and the left-eye viewpoint map and right-eye viewpoint map with the low resolution into a three-dimensional image for display on the display at the display end.

In some embodiments, the at least two display modes comprise a first full definition display mode, a second full definition display mode, a first high-low definition display mode, a second high-low definition display mode, and a third high-low definition display mode; wherein, the full definition resolution in the first full definition display mode is greater than the full definition resolution in the second full definition display mode; the high resolution in the first high-low definition display mode is greater than the high resolution in the second high-low definition display mode, and the high resolution in the second high-low definition display mode is greater than the high resolution in the third high-low definition display mode.

In some embodiments, said determining a current display mode of a display at a display end comprises: causing multiple options to be presented on the display interface of the display at the display end, wherein under a respective option of the multiple options, the target display mode corresponding to the respective option and the corresponding definition information under the target display mode are enabled to be defined, wherein, under the condition that the target display mode is a full definition display mode, the corresponding definition information comprises full definition resolution, and under the condition that the target display mode is a high-low definition display mode, the corresponding definition information comprises a first image region with high resolution and a second image region with low resolution; in response to confirming a target option from the multiple options, determining the target display mode corresponding to the target option as the current display mode of the display at the display end.

In some embodiments, said method further comprises: determining the total time consumed for image processing in the current display mode, wherein the total time consumed for image processing comprises a sum of the time for obtaining the current frame depth information for the scene, the time for generating the left-eye viewpoint map and the right-eye viewpoint map corresponding to human eye positioning coordinate data in the display space, and the time for synthesizing the generated left-eye viewpoint map and the right-eye viewpoint map into the three-dimensional image; in response to the total time consumed for image processing in the current display mode being greater than a time consumption threshold, obtaining at least one display mode from the at least two display modes whose total time consumed for image processing is less than the total time consumed for image processing in the current display mode, wherein the time consumption threshold depends on the refresh rate of the display at the display end in the current display mode; determining the display mode with the greatest total time consumed for image processing from the at least one display mode as a candidate mode for the current display mode for presentation; in response to a confirmation of the candidate mode, determining the candidate mode as the current display mode of the display at the display end.

In some embodiments, said obtaining multiple current frame color images of a scene at the acquisition end according to the current display mode through multiple image acquisition devices at the acquisition end at multiple different viewing angles of the scene at the acquisition end comprises: according to the current display mode, obtaining the multiple current frame color images of the scene through a first acquisition device, a second acquisition device, a third acquisition device and a fourth image acquisition device that are arranged in sequence and at equal intervals along a horizontal edge of the display at the acquisition end.

In some embodiments, said obtaining multiple current frame color images of a scene at the acquisition end according to the current display mode through multiple image acquisition devices at the acquisition end at multiple different viewing angles of the scene at the acquisition end comprises: according to the current display mode, obtaining the multiple current frame color images of the scene through a first acquisition device and a second image acquisition device arranged along one horizontal edge of the display at the acquisition end, and a third acquisition device and a fourth image acquisition device arranged along the other horizontal edge of the display at the acquisition end.

In some embodiments, said obtaining multiple current frame color images of a scene at the acquisition end according to the current display mode through multiple image acquisition devices at the acquisition end at multiple different viewing angles of the scene at the acquisition end comprises: according to the current display mode, obtaining the multiple current frame color images of the scene through a first acquisition device and a second image acquisition device arranged along a horizontal edge of the display at the acquisition end, a third image acquisition device along one vertical edge of the display at the acquisition end, and a fourth image acquisition device along the other vertical edge of the display at the acquisition end.

In some embodiments, at least one of the multiple image acquisition devices comprises a camera.

According to a second aspect of the present disclosure, there is provided a computing device, comprising a memory, a processor and a computer program stored on the memory and run on the processor, wherein the processor, when executes the program, implements any of the methods described above.

According to a third aspect of the present disclosure, there is provided a non-transitory computer readable storage medium, on which a computer instruction is stored, wherein the instruction, when executed by the processor, performs any of the methods described above.

According to a fourth aspect of the present disclosure, there is provided a computer program product comprising a computer program which, when executed by a processor, implements any of the methods described above.

These and other advantages of the present disclosure will be apparent from and set forth with reference to the embodiments described below.

BRIEF DESCRIPTION OF THE DRAWINGS

Embodiments of the present disclosure will now be described in more detail and with reference to the accompanying drawings, wherein

FIG. 3 illustrates a schematic flow chart of a video communication method according to an embodiment of the present disclosure;

FIG. 4 illustrates an exemplary architectural diagram of a viewpoint map generation model according to one embodiment of the present disclosure;

FIG. 5 illustrates an exemplary arrangement of left-eye viewpoint maps;

FIG. 6 illustrates a schematic flow chart of a video communication method according to an embodiment of the present disclosure;

FIG. 7 illustrates an exemplary method of acquiring human eye positioning coordinate data at the display terminal;

FIG. 8A illustrates a pixel arrangement viewpoint map within a single period;

FIG. 10 illustrates an exemplary structural block diagram of a video communication device according to an embodiment of the present disclosure;

FIG. 11 illustrates an exemplary structural block diagram of a video communication device according to another embodiment of the present disclosure;

FIG. 12 illustrates an exemplary flow chart of a display method 1200 according to an embodiment of the present disclosure;

FIG. 21 illustrates an exemplary flowchart of a display method according to an embodiment of the present disclosure;

FIG. 22 shows a schematic diagram of recommending a candidate mode when it is detected that the total image processing time in the current display mode is greater than the time threshold;

DETAILED DESCRIPTION

Specific details of embodiments of the present disclosure will be described below to enable those skilled in the art to fully understand and implement the embodiments of the present disclosure. It should be understood that the technical solution of the present disclosure may be implemented without some of these details. In some cases, the present disclosure does not show or describe well-known structures or functions in detail to avoid unnecessary description from obscuring the description of the embodiments of the present disclosure. The terms used in the present disclosure should be understood in their broadest reasonable manner, even if used in connection with specific embodiments of the present disclosure.

Figure 1:
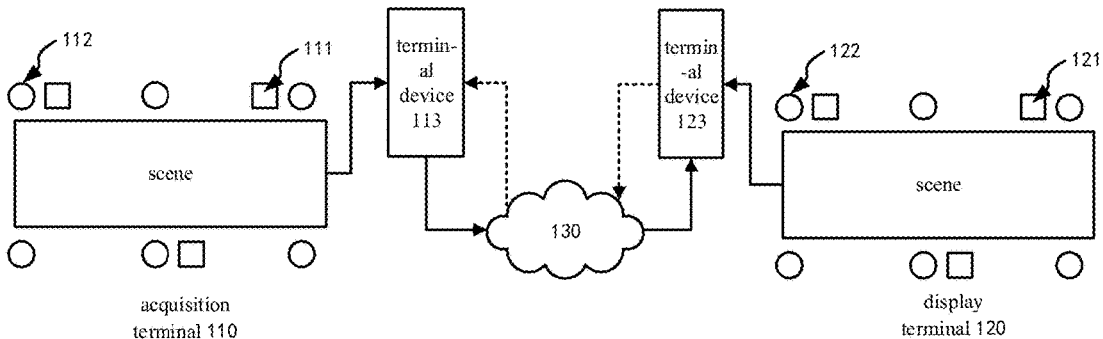
FIG. 1 illustrates a schematic view of an architecture of a video communication system.

FIG. 1 illustrates a schematic view of an architecture 100 of a video communication system in which the technical solution of the present disclosure and the technical solution of the related art can be implemented. As shown in FIG. 1, the architecture 100 comprises an acquisition terminal 110, a display terminal 120 and a network 130. With this architecture, the user at the acquisition terminal 110 can perform video communication with the user at the display terminal 120, for example, 3D video communication, holographic video communication, etc.

The acquisition terminal 110 comprises multiple microphones 111, multiple cameras 112 and a terminal device 113. Similarly, the display terminal comprises multiple microphones 121, multiple cameras 122 and a terminal device 123. As an example, during video communication, the multiple cameras 112 can acquire images of the scene located at the acquisition terminal. The acquired images are processed (e.g., encoded, etc.) by the terminal device 113 and transmitted to the display terminal via the network 130 for display at the display terminal, so that the user at the display terminal is able to participate in video communication immersively, thereby realizing video communication.

It is to be noted that the acquisition terminal and the display terminal described above are just specified as examples for the convenience of description, but are not restrictive. In fact, the display terminal may also be used as an acquisition terminal to acquire images of its scene, and the acquisition terminal may also be used as a display terminal to view the display. In addition, only the way of processing images acquired by the cameras is described here, while processing of audio data acquired by the microphones 121 is omitted, because audios can be processed in any appropriate manner, as long as they are synchronized with images.

The aforementioned terminal device 113 may include, but is not limited to, at least one of a mobile phone, a tablet computer, a notebook computer, a desktop PC, a digital television, and other computing devices or terminals with processing capability. The network 130 may be, for example, a wide area network (WAN), a local area network (LAN), a wireless network, a public telephone network, an intranet, and any other type of network well known to those skilled in the art. It is also to be noted that the scenario described above is only an example in which embodiments of the present disclosure may be implemented, and is not restrictive.

Figure 2:
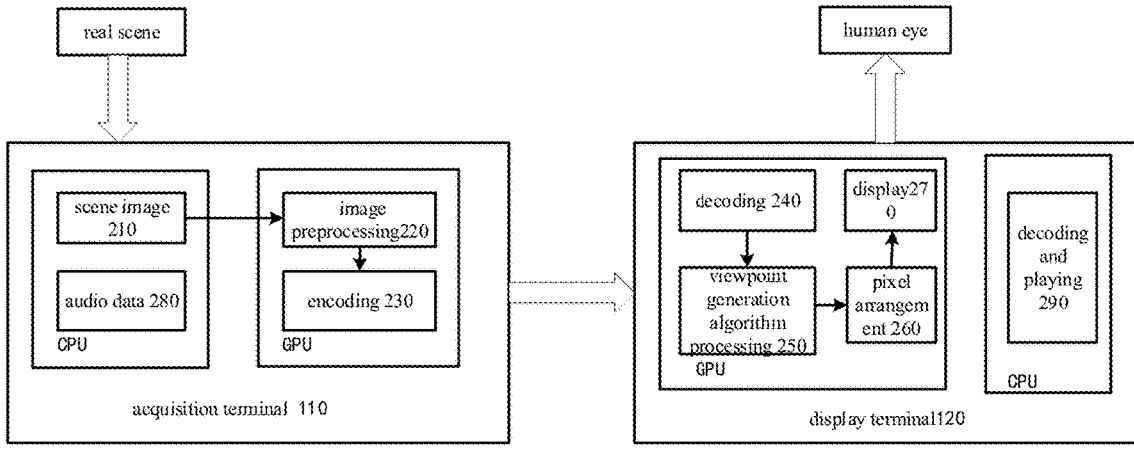
FIG. 2 illustrates a schematic flow chart of a video communication method in the related art.

FIG. 2 illustrates a schematic flow chart of a video communication method in the related art. The method may be implemented in the architecture of the video communication system described with reference to FIG. 1.

As shown in FIG. 2, after the camera 112 of the acquisition terminal 110 has acquired a scene image 210 of the acquisition terminal, it is first transmitted to the CPU (central processing unit) of the terminal device 113. The CPU then transmits the data to, for example, the GPU (graphics processing unit) of the terminal device. The GPU first performs image preprocessing 220 such as color correction and frame interpolation on the acquired scene image data to obtain RGB data, and then directly uses a GPU hardware encoding chip to perform encoding 230 of the RGB data. The encoded data obtained from encoding is uploaded to network 130. The CPU of the display terminal 120 pulls in the encoded data from the network 130 and performs decoding 240 through the GPU hard decoding chip to obtain the scene image data acquired by the camera of the acquisition terminal. At the same time, human eye positioning coordinate data (for example, the horizontal coordinate of the left eye and the horizontal coordinate of the right eye in the display space of the display terminal) of the viewer can be acquired. The scene image data can be processed 250 by, for example, a viewpoint generation algorithm so as to obtain from the scene image data a viewpoint map of a position that human eyes at the display terminal are viewing according to the human eye positioning coordinates of the viewer. Pixel arrangement 260 is performed again in combination with a light field display and display 270 is outputted. Of course, this process further comprises processing of audio data 280, and performing decoding and playing 290 synchronously with the viewpoint map at the display terminal, which will not be described in detail here.

This video communication method is classical and traditional. However, for a multi-camera system, especially when the multiple cameras are ultra-high-resolution acquisition cameras, the cameras acquire a large amount of data, which requires a super powerful graphics card or hardware codec chips of multiple graphics cards to cooperate. This results in a high hardware cost, a high data transmission cost, and a high power consumption of hardware.

FIG. 3 illustrates a schematic flow chart of a video communication method 300 according to an embodiment of the present disclosure. The method 300 may also be implemented in the architecture of the video communication system described with reference to FIG. 1, and may be applied at the acquisition terminal. The video communication here may be, for example, holographic video communication or the like. The method 300 comprises the following steps.

In step 310, human eye positioning coordinate data of a viewer acquired at the display terminal is obtained, wherein the human eye positioning coordinate data comprises a horizontal coordinate of the left eye and a horizontal coordinate of the right eye of the viewer in the display space of the display terminal. The display space here may be, for example, a three-dimensional display space. Usually, the viewer views displayed content at the display terminal through a three-dimensional display or display device, so that the viewer is in a virtual display space. The human eye positioning coordinate data of the viewer can be acquired at the display terminal, and the acquired human eye positioning coordinate data of the viewer can be obtained at the acquisition terminal. As an example, the horizontal direction here is the same as the arrangement direction of viewpoints of the three-dimensional display or display device, i.e., being the same as the horizontal direction or the lateral direction of the three-dimensional display or display device.

As an example, the human eye positioning coordinate data can be acquired at the display terminal in the following manner. For example, a human eye image including the left eye and the right eye of the viewer in the display space of the display terminal may be first obtained. Then, regions of interest including the left eye and the right eye respectively are detected in the human eye image to obtain a left-eye region image and a right-eye region image. Next, the left-eye region image and the right-eye region image are denoised to obtain a left-eye denoised image and a right-eye denoised image. Finally, a gradient calculation is performed on the left-eye denoised image and the right-eye denoised image, respectively, the horizontal coordinate of a point with the largest number of straight line intersections in the gradient direction in the left-eye denoised image as a horizontal coordinate of the left eye of the viewer, and the horizontal coordinate of a point with the largest number of intersections of straight lines in the gradient direction in the right-eye denoised image is determined as a horizontal coordinate of the right eye of the viewer. This enables precise acquisition of human eye positioning coordinate data, which will be further explained later with reference to FIG. 7.

In step 320, a current frame scene image of a scene located at the acquisition terminal is acquired. In some embodiments, at the time of acquiring the current frame scene image of the scene located at the acquisition terminal, a current frame color image of the scene and a current frame depth image of the scene may be acquired at multiple different viewing angles of the acquisition terminal, that is, the current frame scene image may include multiple current frame color images and one or more current frame depth images of the scene. "Multiple" here may refer to two or more. The current frame refers to a scene image that matches the most recently received human eye positioning coordinate data. The matching here can be achieved as follows: while acquiring the current frame scene image, the human eye positioning coordinate data of the viewer acquired at the display terminal is obtained simultaneously to achieve matching; or the human eye positioning coordinate data of the viewer acquired at the display terminal may be obtained first, and the current frame scene image of the scene located at the acquisition terminal is acquired in the most recent time to achieve matching, which will not be limited here.

In step 330, according to the current frame scene image and the human eye positioning coordinate data, a left-eye viewpoint map at a viewpoint corresponding to the horizontal coordinate of the left eye and a right-eye viewpoint map at a viewpoint corresponding to the horizontal coordinate of the right eye in the display space are rendered. Various methods may be used to render a left-eye viewpoint map at a viewpoint corresponding to the horizontal coordinate of the left eye and a right-eye viewpoint map at a viewpoint corresponding to the horizontal coordinate of the right eye in the display space. For example, it is possible to first perform space reconstruction (for example, three-dimensional space reconstruction) according to the current frame scene image to obtain an overall spatial map of the display space, and then render a left-eye viewpoint map at a viewpoint corresponding to the horizontal coordinate of the left eye and a right-eye viewpoint map at a viewpoint corresponding to the horizontal coordinate of the right eye in the display space according to the human eye positioning coordinate data. For another example, frame interpolation may be performed on the current frame scene image according to the human eye positioning coordinate data, thereby rendering a left-eye viewpoint map at a viewpoint corresponding to the horizontal coordinate of the left eye and a right-eye viewpoint map at a viewpoint corresponding to the horizontal coordinate of the right eye in the display space.

In some embodiments, a deep learning network may also be used for rendering, that is, the current frame scene image and the human eye positioning coordinate data are inputted into a trained viewpoint map generation model to obtain a left-eye viewpoint map at a viewpoint corresponding to the horizontal coordinate of the left eye and a right-eye viewpoint map at a viewpoint corresponding to the horizontal coordinate of the right eye in the display space. The trained viewpoint map generation model is trained in any appropriate manner. As an example, it can be trained in the following manner. Firstly, a training set is obtained. The training set includes multiple sample groups. Each sample group includes a sample scene image, a horizontal coordinate of a sample human eye, and a corresponding target viewpoint map at a viewpoint corresponding to the horizontal coordinate of the sample human eye in the display space. Secondly, the sample scene image and the horizontal coordinate of the sample human eye in each sample group are inputted into an initial viewpoint map generation model to obtain a corresponding predicted viewpoint map at a viewpoint corresponding to the horizontal coordinate of the sample human eye in the display space. Thirdly, the initial viewpoint map generation model is adjusted to minimize an error between the target viewpoint map and the predicted viewpoint map to which each sample group corresponds, thereby obtaining the trained viewpoint map generation model. This provides a method for efficiently training a viewpoint map generation model.

As an example, FIG. 4 illustrates an exemplary architectural diagram of a viewpoint map generation model 400 according to an embodiment of the present disclosure. FIG. 4 is described based on an example in which the current scene image includes two color images 401 (for example, RGB images) taken from different viewing angles and one depth image 402. This is just an example. In fact, in actual scenes, color images from more angles are required. The viewpoint map generation model 400 comprises a depth network 410, an optic flow network 420, and a color network 430, which is a three-portion network structure. As shown in FIG. 4, after two color images 401 and one depth image 402 are processed by the three-portion network structure, a required viewpoint map 406 (which may be a left-eye viewpoint map or a right-eye viewpoint map correspondingly according to the input horizontal coordinate of the left eye or the input horizontal coordinate of the right eye) is finally outputted. Specifically, by using a projection matrix composed of camera external parameters to project the input depth image 402, two relatively rough depth maps 403 corresponding to the input color images can be obtained. After the two depth maps 403 and color images 401 are processed by the deep network 410, two depth maps 404 with higher accuracy can be outputted. The depth maps 404 are combined with the camera external parameters to serve as an input to the optic flow network, and an output is two optic flow maps 405 (an optic flow is a movement pattern of objects, surfaces and edges in a visual scene caused by a relative movement between the observer and the scene. Generally, an optic flow is generated by a movement of the foreground object itself in the scene, a movement of the observer, or movements of both). The optic flow maps 405, the two color images 401, and the horizontal coordinate of the left eye or the horizontal coordinate of the right eye are used as inputs to the color network, and a corresponding viewpoint map 406 is outputted.

In step 340, the rendered left-eye viewpoint map and right-eye viewpoint map are transmitted to the display terminal, so as to perform display at the display terminal according to the rendered left-eye viewpoint map and right-eye viewpoint map. For example, the rendered left-eye viewpoint map and right-eye viewpoint map are displayed to the left eye and the right eye of the viewer respectively, so as to obtain a three-dimensional display experience.

In some embodiments, when the rendered left-eye viewpoint map and right-eye viewpoint map are transmitted to the display terminal, the human eye positions may have changed and are no longer at the original horizontal coordinates, which results in changes in the viewing angles of the human eyes. For example, the human eye positioning coordinate data of the viewer is acquired at the display terminal at a first moment, and after the rendered left-eye viewpoint map and right-eye viewpoint map are transmitted to the display terminal, the human eye positioning coordinates of the viewer are acquired again at a second moment so as to determine whether the human eye positions have changed. In order to be able to cope with the situation where changes have occurred, the method may further comprise the steps of: rendering left-eye viewpoint maps at multiple left eye viewpoints and right-eye viewpoint maps at multiple right eye viewpoints in the display space according to the current frame scene image, the horizontal coordinates corresponding to the multiple left eye viewpoints and the horizontal coordinates corresponding to the multiple right eye viewpoints, wherein the horizontal coordinates to which a portion of left eye viewpoints of the multiple left eye viewpoints correspond are smaller than the horizontal coordinate of the left eye, and the horizontal coordinates to which the other portion of left eye viewpoints correspond are greater than the horizontal coordinate of the left eye, and wherein the horizontal coordinates to which a portion of right eye viewpoints of the multiple right eye viewpoints correspond are smaller than the horizontal coordinate of the right eye, and the horizontal coordinates to which the other portion of right eye viewpoints correspond are greater than the horizontal coordinate of the right eye. The left eye viewpoint here is a viewpoint in the display space, not the left eye, thus the horizontal coordinate to which the left eye viewpoint corresponds is also different from the horizontal coordinate of the left eye. Similarly, the horizontal coordinate to which the right eye viewpoint corresponds is also different from the horizontal coordinate of the right eye. This step may be performed synchronously with step 330, for example. Correspondingly, when the rendered left-eye viewpoint map and right-eye viewpoint map are transmitted to the display terminal so as to perform display at the display terminal according to the rendered left-eye viewpoint map and right-eye viewpoint map, the rendered left-eye viewpoint maps and right-eye viewpoint maps may be transmitted to the display terminal, so as to determine, from rendered left-eye viewpoint maps and right-eye viewpoint maps, viewpoint maps at viewpoints corresponding to the human eye positioning coordinate data acquired at the second moment for display according to the human eye positioning coordinate data acquired at the second moment after the first moment. In this way, in addition to rendering a left-eye viewpoint map at a viewpoint corresponding to the horizontal coordinate of the left eye and a right-eye viewpoint map at a viewpoint corresponding to the horizontal coordinate of the right eye, viewpoint maps to which the left eye viewpoints around the viewpoint corresponding to the horizontal coordinate of the left eye and the right eye viewpoints around the viewpoint corresponding to the horizontal coordinate of the right eye correspond are also rendered. This makes these rendered left-eye viewpoint maps and right-eye viewpoint maps include viewpoint maps to which the human eyes of the viewer should correspond at the second moment, so that the display terminal can obtain corresponding viewpoint maps therefrom for display. For example, the display terminal can obtain corresponding viewpoint maps for display by setting a regular moving distance for the time period between the first moment and the second moment based on the moving distance of human eyes or based on experience (such a time period is usually short, so the moving distance is usually a small fixed value), etc., which is not restrictive. The numbers of left-eye viewpoint maps and right-eye viewpoint maps are not limited and not necessarily equal to each other, which may be set based on needs or experience, but are usually small, such as 2 or 3.

In some embodiments, the number N of said portion of left eye viewpoints depends on a moving distance between the horizontal coordinate of the left eye acquired at the second moment and the horizontal coordinate of the left eye acquired at the first moment during the previous frame period. The previous frame period represents a process of determining a viewpoint map at a corresponding viewpoint for display using the previous frame scene image before the current frame scene image. For example, if the moving distance between the horizontal coordinate of the left eye acquired at the second moment and the horizontal coordinate of the left eye acquired at the first moment during the previous frame period is large, it indicates that the human eyes of the viewer move fast, and correspondingly, the number of said portion of left eye viewpoints may be set to be larger. If the moving distance between the horizontal coordinate of the left eye acquired at the second moment and the horizontal coordinate of the left eye acquired at the first moment during the previous frame period is small, it indicates that the human eyes of the viewer move slowly, and correspondingly, the number of said portion of left eye viewpoints may be set to be smaller. Similarly, the number of said other portion of left eye viewpoints may also depend on a moving distance between the horizontal coordinate of the left eye acquired at the second moment and the horizontal coordinate of the left eye acquired at the first moment during the previous frame period. Likewise, the number of said portion of right eye viewpoints and the number of said other portion of right eye viewpoints may depend on a moving distance between the horizontal coordinate of the right eye acquired at the second moment and the horizontal coordinate of the right eye acquired at the first moment during the previous frame period.

In some embodiments, the number of said portion of left eye viewpoints is determined by: determining a moving distance between the horizontal coordinate of the left eye acquired at the second moment and the horizontal coordinate of the left eye acquired at the first moment during the previous frame period; dividing the moving distance by a spacing between adjacent viewpoints of the display presenting the display space to obtain a distance ratio; in response to the distance ratio being an integer, determining the distance ratio as a number of said portion of left eye viewpoints; in response to the distance ratio being not an integer, determining a minimum positive integer larger than the distance ratio as a number of said portion of left eye viewpoints. The number of said portion of left eye viewpoints may be determined, for example, at the display terminal, but of course this is not restrictive. If the current frame is the first frame (there is no previous frame), the number of said portion of left eye viewpoints may be determined as a default value, such as 0 or 1, etc. The number of said other portion of left eye viewpoints, the number of said portion of right eye viewpoints, and the number of said other portion of right eye viewpoints may also be determined in a similar manner, and the description will not be repeated here.

In some embodiments, the number of left-eye viewpoint maps at the multiple left eye viewpoints is equal to the number of right-eye viewpoint maps at the multiple right eye viewpoints, the number of said portion of left eye viewpoints is equal to the number of said other portion of left eye viewpoints, and the number of said portion of right eye viewpoints is equal to the number of said other portion of right eye viewpoints, and wherein said portion of left eye viewpoints and said other portion of left eye viewpoints respectively include viewpoints adjacent to the viewpoint corresponding to the horizontal coordinate of the left eye, and are arranged successively according to the sequence of viewpoints in the display space. Said portion of right eye viewpoints and said other portion of right eye viewpoints respectively include viewpoints adjacent to the viewpoint corresponding to the horizontal coordinate of the right eye, and are arranged successively according to the sequence of viewpoints in the display space. It is assumed that the number of said portion of left eye viewpoints is N. In this case, the acquisition terminal transmits 4N+2 viewpoint maps in total to the display terminal (including a left-eye viewpoint map at the viewpoint corresponding to the horizontal coordinate of the left eye, a right-eye viewpoint map at the viewpoint corresponding to the horizontal coordinate of the right eye). FIG. 5 illustrates an exemplary arrangement of left-eye viewpoint maps, in which the viewpoint corresponding to the horizontal coordinate of the left eye is illustrated as L, the number of said portion of left eye viewpoints is 2, which are illustrated as L1 and L2, and the number of said other portion of left eye viewpoints is also 2, which are illustrated as L3 and L4, wherein, as shown in FIG. 4, L2 and L are adjacent viewpoints of L1 in the display space ("adjacent" means that there are no other viewpoints between them), and L4 and L are adjacent viewpoints of L3. Similarly, the arrangement of the right-eye viewpoint maps is similar to the arrangement of left-eye viewpoint maps, and will not be repeated here.

As an example, the human eye positioning coordinate data at the first moment is obtained during the previous frame period (for example, the horizontal coordinate of the left eye is LX1 and the horizontal coordinate of the right eye is RX1). After the display terminal receives 4N+2 viewpoint maps during the previous frame period, the human eye positioning coordinate data is acquired again at the second moment (for example, the horizontal coordinate of the left eye is LX2 and the horizontal coordinate of the right eye is RX2). Then, S=|LX2−LX1| is determined for the left eye (the 20 right eye is similar, the value is the same for the right eye in the same row as the value calculated for the left eye), where S is a moving distance between the horizontal coordinate of the left eye acquired at the second moment and the horizontal coordinate of the left eye acquired at the first moment during the previous frame period. If the spacing between adjacent viewpoints of the display is M (this value is related to the optical characteristics of the display, and once the display is determined, this value is a fixed value), S is divided by M to obtain a distance ratio K. If K is an integer, the value of K is determined as the value of N. If the K value is not an integer, a minimum positive integer larger than K is determined as the value of N. The N value determined in this way is a dynamic value, and the N value can be intelligently adjusted in real time according to the moving speed of the human eye. The N value is also calculated and saved during the current frame period, and is transmitted to the acquisition terminal for use in the next frame.

In the video communication method claimed in the present disclosure, the acquisition terminal obtains the human eye positioning coordinate data of the viewer acquired at the display terminal, renders a left-eye viewpoint map at a viewpoint corresponding to the horizontal coordinate of the left eye, and a right-eye viewpoint map at a viewpoint corresponding to the horizontal coordinate of the right eye in the display space based on the current frame scene image of the scene at the acquisition terminal acquired by the acquisition terminal and the human eye positioning coordinates data, and then transmits the rendered left-eye viewpoint map and right-eye viewpoint map to the display terminal so as to perform display at the display terminal according to the rendered left-eye viewpoint map and right-eye viewpoint map. This makes it only necessary to render corresponding viewpoint maps for the left and right eyes at the acquisition terminal and transmit them to the display terminal, so as to perform display at the display terminal according to the rendered left-eye viewpoint map and right-eye viewpoint map. In this way, since only partial viewpoint maps are rendered at the acquisition terminal, the data amount of the rendered viewpoint maps is greatly smaller than the data amount of the scene maps captured by all cameras. Therefore, this technical solution does not require encoding/decoding and transmission of a large amount of data acquired by multiple cameras, thereby reducing needs for hardware such as GPU, decreasing the cost of data transmission (e.g., decreasing the requirements on network bandwidth and server bandwidth), and greatly reducing the power consumption of hardware.

FIG. 6 illustrates a schematic flow chart of a video communication method 600 according to an embodiment of the present disclosure. The method 600 may also be implemented in the architecture of the video communication system described with reference to FIG. 1, and may be applied to the display terminal. The video communication here may be, for example, holographic video communication or the like. The method 600 comprises the following steps.

In step 610, human eye positioning coordinate data of a viewer located at the display terminal is acquired, wherein the human eye positioning coordinate data comprises a horizontal coordinate of the left eye and a horizontal coordinate of the right eye of the viewer in the display space of the display terminal. The display space here may be, for example, a three-dimensional display space. Usually, the viewer views displayed content at the display terminal through a three-dimensional display or display device, so that the viewer is in a virtual display space. As an example, the horizontal direction here is the same as the arrangement direction of viewpoints of the three-dimensional display or display device, i.e., being the same as the horizontal direction or the lateral direction of the three-dimensional display or display device.

As an example, FIG. 7 illustrates an exemplary method 700 for acquiring human eye positioning coordinate data at the display terminal. As shown in FIG. 7, in step 710, a human eye image including the left eye and the right eye of the viewer in the display space of the display terminal is obtained. In some embodiments, the human eye image may be captured using a camera located in a middle region of the display space at the display terminal. Then, in step 710, a region of interest including the left eye is detected in the human eye image to obtain a left-eye region image, and a region of interest including the right eye is detected to obtain a right-eye region image. At 730, the left-eye region image and the right-eye region image are denoised to obtain a left-eye denoised image and a right-eye denoised image. In step 740, a gradient calculation is performed on the left-eye denoised image and the right-eye denoised image respectively, and the horizontal coordinate of a point with a largest number of straight line intersections in the gradient direction in a respective denoised image of the left-eye denoised image and the right-eye denoised image is determined as the horizontal coordinate of an eye of the viewer in a respective direction. That is, the horizontal coordinate of a point with a largest number of straight line intersections in the gradient direction in the left-eye denoised image and the right-eye denoised image is determined as the horizontal coordinate of the left eye of the viewer, and the horizontal coordinate of a point with a largest number of straight line intersections in the gradient direction in the right-eye denoised image is determined as the horizontal coordinate of the right eye of the viewer. Usually, gradient includes amplitude and direction. For an eye image, the position closer to the eyeball center will have a lower gray value, and there will be more connection lines in the gradient direction intersecting at that point. Therefore, the determination of the human eye center position (i.e., human eye positioning data) is to find a point with a largest number of straight line intersections in the gradient direction. With this method, human eye positioning coordinate data can be accurately acquired.

In step 620, the human eye positioning coordinate data is transmitted to the acquisition terminal. The human eye positioning coordinate data is transmitted to the acquisition terminal, so that the acquisition terminal can render multiple left-eye viewpoint maps and multiple right-eye viewpoint maps according to the human eye positioning coordinate data, which is similar to the embodiment described with reference to FIG. 3.

In step 630, left-eye viewpoint maps and right-eye viewpoint maps are obtained. The left-eye viewpoint maps include a left-eye viewpoint map at a viewpoint corresponding to the horizontal coordinate of the left eye in the display space which is rendered by the acquisition terminal according to the current frame scene image acquired by the acquisition terminal and the human eye positioning coordinate data, and the right-eye viewpoint maps include a right-eye viewpoint map at a viewpoint corresponding to the horizontal coordinate of the right eye in the display space which is rendered by the acquisition terminal according to the current frame scene image acquired by the acquisition terminal and the human eye positioning coordinate data.

In some embodiments, the current frame scene image acquired by the acquisition terminal includes current frame color images of the scene and current frame depth images of the scene acquired at multiple different viewing angles of the acquisition terminal. "Multiple" here may refer to two or more. The current frame refers to a scene image that matches the human eye positioning coordinate data received by the acquisition terminal most recently.

The acquisition terminal may employ various methods to render a left-eye viewpoint map at a viewpoint corresponding to the horizontal coordinate of the left eye and a right-eye viewpoint map at a viewpoint corresponding to the horizontal coordinate of the right eye in the display space. For example, it is possible to first perform space reconstruction (for example, three-dimensional space reconstruction) according to the current frame scene image to obtain an overall spatial map of the display space, and then render a left-eye viewpoint map at a viewpoint corresponding to the horizontal coordinate of the left eye and a right-eye viewpoint map at a viewpoint corresponding to the horizontal coordinate of the right eye in the display space according to the human eye positioning coordinate data. For another example, frame interpolation may be performed on the current frame scene image according to the human eye positioning coordinate data, thereby rendering a left-eye viewpoint map at a viewpoint corresponding to the horizontal coordinate of the left eye and a right-eye viewpoint map at a viewpoint corresponding to the horizontal coordinate of the right eye in the display space.

In some embodiments, a deep learning network may also be used for rendering, that is, the current frame scene image and the human eye positioning coordinate data are inputted into a trained viewpoint map generation model to obtain a left-eye viewpoint map at a viewpoint corresponding to the horizontal coordinate of the left eye and a right-eye viewpoint map at a viewpoint corresponding to the horizontal coordinate of the right eye in the display space. The trained viewpoint map generation model is trained in any appropriate manner, such as the training manners described in the embodiment of FIG. 3.

In step 640, display is performed based on the obtained left-eye viewpoint maps and right-eye viewpoint maps.

In some embodiments, when the display terminal obtains the left-eye viewpoint map and the right-eye viewpoint map, the human eye positions may have changed and are no longer located at the original horizontal coordinates, which results in changes in the viewing angles of the human eyes. For example, the human eye positioning coordinate data of the viewer is acquired at the display terminal at a first moment, and after the display terminal obtains the left-eye viewpoint map and the right-eye viewpoint map, the human eye positioning coordinates of the viewer are acquired again at a second moment so as to determine whether the human eye positions have changed. In order to be able to cope with the situation where changes have occurred, the left-eye viewpoint maps rendered by the acquisition terminal may further include left-eye viewpoint maps at multiple left eye viewpoints, and the rendered right-eye viewpoint maps may further include right-eye viewpoint maps at multiple right eye viewpoints; wherein the horizontal coordinates to which a portion of left eye viewpoints of the multiple left eye viewpoints correspond are smaller than the horizontal coordinate of the left eye, and the horizontal coordinates to which the other portion of left eye viewpoints correspond are greater than the horizontal coordinate of the left eye, and wherein the horizontal coordinates to which a portion of right eye viewpoints of the multiple right eye viewpoints correspond are smaller than the horizontal coordinate of the right eye, and the horizontal coordinates to which the other portion of right eye viewpoints correspond are greater than the horizontal coordinate of the right eye. In this case, when performing display at the display terminal according to the obtained left-eye viewpoint maps and right-eye viewpoint maps, it is possible to determine, from rendered left-eye viewpoint maps and right-eye viewpoint maps, viewpoint maps at viewpoints corresponding to the human eye positioning coordinate data acquired at the second moment for display according to the human eye positioning coordinate data acquired at the second moment after the first moment. In other words, in addition to rendering a left-eye viewpoint map at a viewpoint corresponding to the horizontal coordinate of the left eye and a right-eye viewpoint map at a viewpoint corresponding to the horizontal coordinate of the right eye, the acquisition terminal also renders viewpoint maps to which the left eye viewpoints around the viewpoint corresponding to the horizontal coordinate of the left eye and the right eye viewpoints around the viewpoint corresponding to the horizontal coordinate of the right eye correspond. The display terminal can obtain corresponding viewpoint maps for display by setting a regular moving distance for the time period between the first moment and the second moment based on the moving distance of the human eyes or based on experience (such a time period is usually short, so the moving distance is usually a small fixed value), etc., which is not restrictive. The numbers of left-eye viewpoint maps and right-eye viewpoint maps are not limited and not necessarily equal to each other, which may be set based on needs or experience, but are usually small, such as 2 or 3. In some embodiments, at the time of determining, based on human eye positioning coordinate data acquired at a second moment after the first moment, viewpoint maps at viewpoints corresponding to the human eye positioning coordinate data acquired at the second moment from rendered left-eye viewpoint maps and right-eye viewpoint maps for display, it is possible to determine a first horizontal coordinate closest to the horizontal coordinate of the left eye acquired at the second moment from the horizontal coordinates to which the rendered left-eye viewpoint maps correspond, and to determine a second horizontal coordinate closest to the horizontal coordinate of the right eye acquired at the second moment from the horizontal coordinates to which the rendered right-eye viewpoint maps correspond. Then, a left-eye viewpoint map to which the first horizontal coordinate corresponds and a right-eye viewpoint map to which the second horizontal coordinate corresponds are displayed. During display, pixels can be rearranged based on the optical display characteristics of the display so as to obtain and display image data that the display needs to display, which will be described in detail below.

In some embodiments, the number N of said portion of left eye viewpoints depends on a moving distance between the horizontal coordinate of the left eye acquired at the second moment and the horizontal coordinate of the left eye acquired at the first moment during the previous frame period. The previous frame period represents a process of determining a viewpoint map at a corresponding viewpoint for display using the previous frame scene image before the current frame scene image. For example, if the moving distance between the horizontal coordinate of the left eye acquired at the second moment and the horizontal coordinate of the left eye acquired at the first moment during the previous frame period is large, it indicates that the human eyes of the viewer move fast, and correspondingly, the number of said portion of left eye viewpoints may be set to be larger. If the moving distance between the horizontal coordinate of the left eye acquired at the second moment and the horizontal coordinate of the left eye acquired at the first moment during the previous frame period is small, it indicates that the human eyes of the viewer move slowly, and correspondingly, the number of said portion of left eye viewpoints may be set to be smaller. Similarly, the number of said other portion of left eye viewpoints may also depend on a moving distance between the horizontal coordinate of the left eye acquired at the second moment and the horizontal coordinate of the left eye acquired at the first moment during the previous frame period. Likewise, the number of said portion of right eye viewpoints and the number of said other portion of right eye viewpoints may depend on a moving distance between the horizontal coordinate of the right eye acquired at the second moment and the horizontal coordinate of the right eye acquired at the first moment during the previous frame period.

In some embodiments, the number of said portion of left eye viewpoints can be determined by: determining a moving distance between the horizontal coordinate of the left eye acquired at the second moment and the horizontal coordinate of the left eye acquired at the first moment during the previous frame period; dividing the moving distance by a spacing between adjacent viewpoints of the display presenting the display space to obtain a distance ratio; in response to the distance ratio being an integer, determining the distance ratio as a number of said portion of left eye viewpoints; in response to the distance ratio being not an integer, determining a minimum positive integer larger than the distance ratio as a number of said portion of left eye viewpoints. The number of said portion of left eye viewpoints may be determined, for example, at the display terminal, but of course this is not restrictive. If the current frame is the first frame (there is no previous frame), the number of said portion of left eye viewpoints may be determined as a default value, such as 0 or 1, etc. The number of said other portion of left eye viewpoints, the number of said portion of right eye viewpoints, and the number of said other portion of right eye viewpoints may also be determined in a similar manner, which will not be repeated here.

In some embodiments, the number of left-eye viewpoint maps at the multiple left eye viewpoints is equal to the number of right-eye viewpoint maps at the multiple right eye viewpoints, the number of said portion of left eye viewpoints is equal to the number of said other portion of left eye viewpoints, and the number of said portion of right eye viewpoints is equal to the number of said other portion of right eye viewpoints, and wherein said portion of left eye viewpoints and said other portion of left eye viewpoints respectively include viewpoints adjacent to the viewpoint corresponding to the horizontal coordinate of the left eye, and are arranged successively according to the sequence of viewpoints in the display space. Said portion of right eye viewpoints and said other portion of right eye viewpoints respectively include viewpoints adjacent to the viewpoint corresponding to the horizontal coordinate of the right eye, and are arranged successively according to the sequence of viewpoints in the display space. It is assumed that the number of said portion of left eye viewpoints is N. In this case, the display terminal obtains 4N+2 viewpoint maps in total (including a left-eye viewpoint map at the viewpoint corresponding to the horizontal coordinate of the left eye, a right-eye viewpoint map at the viewpoint corresponding to the horizontal coordinate of the right eye).

As an example, the human eye positioning coordinate data at the first moment is obtained during the previous frame period (for example, the horizontal coordinate of the left eye is LX1 and the horizontal coordinate of the right eye is RX1). After the display terminal receives 4N+2 viewpoint maps during the previous frame period, the human eye positioning coordinate data is acquired again at the second moment (for example, the horizontal coordinate of the left eye is LX2 and the horizontal coordinate of the right eye is RX2). Then, $S=|LX2-LX1|$ is determined for the left eye (the right eye is similar, the value is the same for the right eye in the same row as the value calculated for the left eye), where S is a moving distance between the horizontal coordinate of the left eye acquired at the second moment and the horizontal coordinate of the left eye acquired at the first moment during the previous frame period. If the spacing between adjacent viewpoints of the display (e.g., 3D display) is M (this value is related to the optical characteristics of the display, and once the display is determined, this value is a fixed value), S is divided by M to obtain a distance ratio K. If K is an integer, the value of K is determined as the value of N. If the K value is not an integer, a minimum positive integer larger than K is determined as the value of N. The N value determined in this way is a dynamic value, and the N value can be intelligently adjusted in real time according to the moving speed of the human eye. The N value is also calculated and saved during the current frame period, and is transmitted to the acquisition terminal for use in the next frame.

These viewpoint maps obtained by the display terminal have a corresponding horizontal coordinate in the display space, respectively. In some embodiments, at the time of determining, based on human eye positioning coordinate data acquired at a second moment after the first moment, viewpoint maps at viewpoints corresponding to the human eye positioning coordinate data acquired at the second moment from rendered left-eye viewpoint maps and right-eye viewpoint maps for display, it is possible to determine a first horizontal coordinate closest to the horizontal coordinate of the left eye acquired at the second moment from the horizontal coordinates to which the rendered left-eye viewpoint maps correspond, and to determine a second horizontal coordinate closest to the horizontal coordinate of the right eye acquired at the second moment from the horizontal coordinates to which the rendered right-eye viewpoint maps correspond. Then, a left-eye viewpoint map to which the first horizontal coordinate corresponds, a right-eye viewpoint map to which the second horizontal coordinate corresponds, and viewpoint maps at viewpoints corresponding to the human eye positioning coordinate data acquired at the second moment are displayed. During display, pixels can be rearranged based on the optical display characteristics of the display so as to obtain and display image data that the display needs to display. As an example, coordinates closest to LX2 and RX2 are found from the horizontal coordinates to which the aforementioned 4N+2 viewpoint maps correspond, and the viewpoint maps to which the coordinates correspond are viewpoint maps that needs to be displayed. Then, pixels are rearranged based on the optical display characteristics of the display so as to obtain and display image data that the display needs to display.

In some embodiments, when pixels are being rearranged, the position of a sub-pixel in the display screen corresponding to the viewpoint where the viewpoint map (the viewpoint map is one of the left-eye viewpoint map and the right-eye viewpoint map described above) is located is first determined, and a sub-pixel corresponding to the viewpoint map is then arranged at the position of the sub-pixel of the display screen for display.

Figure 8B:
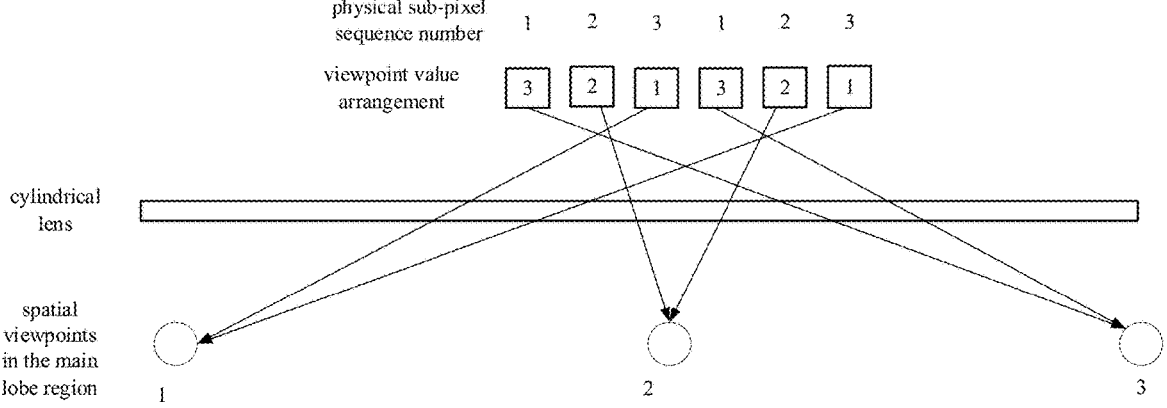
FIG. 8B illustrates a pixel arrangement viewpoint map within multiple periods.

As an example, general naked-eye 3D displays mostly use a cylindrical lens array principle. Here, detailed description will be provided based on an example in which an optical cylindrical lens array is arranged vertically and attached to the screen. It is assumed that a cylindrical lens covers 16 sub-pixels (screen sub-pixels) of the screen laterally, as shown in FIG. 8A. The physical sub-pixel sequence number mark the actual sub-pixel positions of the screen, which are 1 to 16 sub-pixels from left to right. The viewpoint value arrangement indicates which sub-pixels 16 images taken in a virtual scene should be filled into. A certain sub-pixel value of the 16-th image in FIG. 8A is filled into a sub-pixel of the screen with a physical sub-pixel sequence number 1. After passing through the cylindrical lens, said sub-pixel can be seen by human eyes at the position of the spatial viewpoint 16 in the main lobe region. Therefore, when pixels are being rearranged, a sub-pixel in the viewpoint map at the viewpoint 16 should be arranged at the position of the physical sub-pixel sequence number 1 for display. FIG. 8A only illustrates a pixel arrangement viewpoint map within a single period (i.e., a single viewpoint sub-pixel). However, one viewpoint map includes multiple sub-pixels, and FIG. 8B illustrates a schematic view in this case, i.e., a schematic view of multi-period pixel arrangement. As shown in FIG. 8B, the sub-pixel 3 of the viewpoint map corresponding to the viewpoint 3 is sequentially arranged at the position of the physical sub-pixel sequence number 1 for display, the sub-pixel 2 of the viewpoint map corresponding to the viewpoint 2 is sequentially arranged at the position of the physical sub-pixel sequence number 2 for display, and the sub-pixel 1 of the viewpoint map corresponding to the viewpoint 1 is sequentially arranged at the position of the physical sub-pixel sequence number 3 for display.

In the video communication method claimed in the present disclosure, the display terminal transmits the acquired human eye positioning coordinate data of the viewer to the acquisition terminal, and obtains left-eye viewpoint maps and right-eye viewpoint maps from the acquisition terminal, wherein the left-eye viewpoint maps includes a left-eye viewpoint map at a viewpoint corresponding to the horizontal coordinate of the left eye in the display space which is rendered by the acquisition terminal according to the current frame scene image acquired by the acquisition terminal and the human eye positioning coordinate data, and the right-eye viewpoint maps includes a right-eye viewpoint map at a viewpoint corresponding to the horizontal coordinate of the right eye in the display space which is rendered by the acquisition terminal according to the current frame scene image acquired by the acquisition terminal and the human eye positioning coordinate data, and then performs display according to the obtained left-eye viewpoint maps and right-eye viewpoint maps. This eliminates the need for the display terminal to render a large number of viewpoint maps. It is only required to transmit the acquired human eye positioning coordinate data of the viewer to the acquisition terminal, and render corresponding viewpoint maps for left and right eyes at the acquisition terminal and transmit them to the display terminal, so as to perform display at the display terminal according the rendered left-eye viewpoint map and right-eye viewpoint map. In this way, since only partial viewpoint maps are rendered at the acquisition terminal, the data amount of the rendered viewpoint maps is greatly smaller than the data amount of the scene maps captured by all cameras. Therefore, this technical solution does not require encoding/decoding and transmission of a large amount of data acquired by multiple cameras, thereby reducing needs for hardware such as GPU, decreasing the cost of data transmission (e.g., decreasing the requirements on network bandwidth and server bandwidth), and greatly reducing the power consumption of hardware.

It is to be noted that the embodiment described with reference to FIG. 3 and the embodiment described with reference to FIG. 6 may be used together. As an example, FIG. 9 illustrates a schematic flow chart of a video communication method according to an embodiment of the present disclosure.

Figure 9:
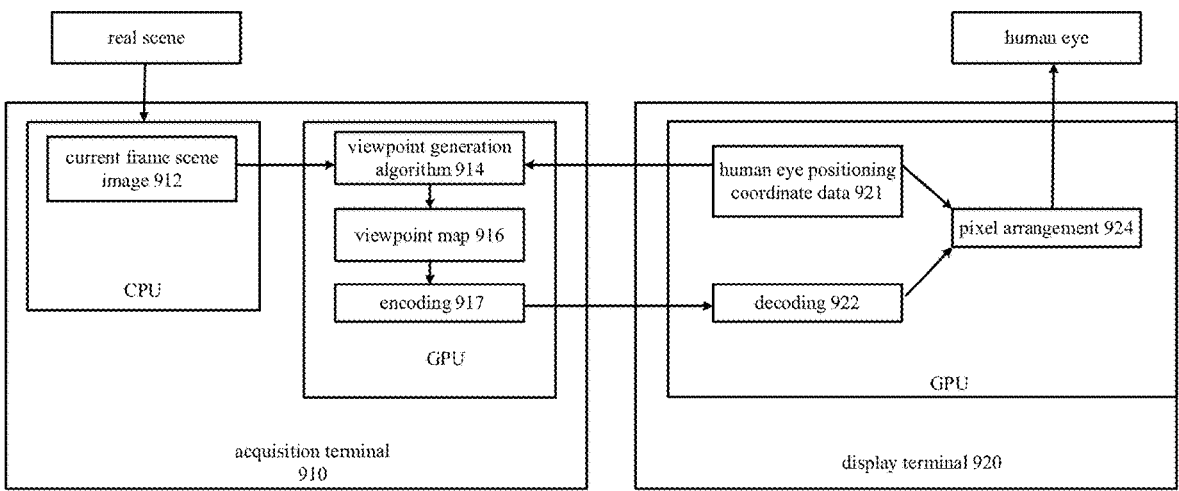
FIG. 9 illustrates a schematic flow chart of a video communication method according to an embodiment of the present disclosure.

As shown in FIG. 9, after human eye positioning coordinate data 921 of a viewer located at the display terminal is acquired, a display terminal 920 transmits it to an acquisition terminal 910. After or while obtaining the human eye positioning coordinate data of the viewer acquired at the display terminal, the acquisition terminal 910 acquires a current frame scene image 912 of a scene located at the acquisition terminal and transmits it to the CPU. The CPU then transmits the current frame scene image 912 to the GPU. Then, the GPU of the acquisition terminal uses, for example, various viewpoint generation algorithms 914 to render a left-eye viewpoint map at a viewpoint corresponding to the horizontal coordinate of the left eye and a right-eye viewpoint map at a viewpoint corresponding to the horizontal coordinate of the right eye in the display space according to the current frame scene image and the human eye positioning coordinate data, such as viewpoint maps 916 in the figure. Thereafter, the viewpoint maps 916 are encoded 917 to obtain encoded data. The acquisition terminal transmits the encoded data to the display terminal 920 via a network, for example. After the display terminal obtains the encoded data, it uses the GPU to decode 922 the encoded data to obtain the viewpoint maps 916. Then, pixel arrangement 924 is performed again based on the optical display characteristics of the 3D display so as to obtain and display image data that the display needs to display.

FIG. 10 illustrates an exemplary structural block diagram of a video communication device 1000 according to an embodiment of the present disclosure, which is applied to an acquisition terminal. As shown in FIG. 10, the video communication device 1000 comprises a coordinate data obtaining module 1010, a scene image acquisition module 1020, a viewpoint map rendering module 1100, and a viewpoint map transmission module 1040.

The coordinate data obtaining module 1010 is configured to obtain human eye positioning coordinate data of a viewer acquired at the display terminal, wherein the human eye positioning coordinate data includes a horizontal coordinate of the left eye and a horizontal coordinate of the right eye of the viewer in the display space of the display terminal. The scene image acquisition module 1020 is configured to acquire a current frame scene image of a scene located at the acquisition terminal. The viewpoint map rendering module 1030 is configured to render, according to the current frame scene image and the human eye positioning coordinate data, a left-eye viewpoint map at a viewpoint corresponding to the horizontal coordinate of the left eye and a right-eye viewpoint map at a viewpoint corresponding to the horizontal coordinate of the right eye in the display space. The viewpoint map transmission module 1040 is configured to transmit the rendered left-eye viewpoint map and right-eye viewpoint map to the display terminal, so as to perform display at the display terminal according to the rendered left-eye viewpoint map and right-eye viewpoint map.

The video communication device 1000 has the same high technical effect as the method described with reference to FIG. 3, which will not be repeated here.

FIG. 11 illustrates an exemplary structural block diagram of a video communication device 1100 according to an embodiment of the present disclosure, which is applied to a display terminal. As shown in FIG. 11, the video communication device 1100 comprises a coordinate data acquisition module 1110, a coordinate data transmission module 1120, a viewpoint map obtaining module 1130, and a viewpoint map display module 1140.

The coordinate data acquisition module 1110 is configured to acquire human eye positioning coordinate data of a viewer located at the display terminal, wherein the human eye positioning coordinate data includes a horizontal coordinate of the left eye and a horizontal coordinate of the right eye of the viewer in the display space of the display terminal. The coordinate data transmission module 1120 is configured to transmit the human eye positioning coordinate data to an acquisition terminal. The viewpoint map obtaining module 1130 is configured to obtain a left-eye viewpoint map and a right-eye viewpoint map. The left-eye viewpoint map includes a left-eye viewpoint map at a viewpoint corresponding to the horizontal coordinate of the left eye in the display space which is rendered by the acquisition terminal according to the current frame scene image acquired by the acquisition terminal and the human eye positioning coordinate data, and the right-eye viewpoint map includes a right-eye viewpoint map at a viewpoint corresponding to the horizontal coordinate of the right eye in the display space which is rendered by the acquisition terminal according to the current frame scene image acquired by the acquisition terminal and the human eye positioning coordinate data. The viewpoint map display module 1140 is configured to perform display according to the obtained left-eye viewpoint maps and right-eye viewpoint maps.

The video communication device 1100 has the same high technical effect as the method described with reference to FIG. 6, which will not be repeated here.

FIG. 12 illustrates an exemplary flow chart of a display method 1200 according to an embodiment of the present disclosure. The method 1200 may be implemented, for example, on the terminal device 123 or the terminal device 113 described with reference to FIG. 1 or on a cloud on the network 130. Specifically, it may be implemented as a viewpoint generation algorithm or a part of a viewpoint generation algorithm described with reference to FIG. 2 or FIG. 9. The display method is mainly used in a scene for video communication, and therefore may also be referred to as a video communication method. As shown in FIG. 12, the method 120 comprises steps 1210-1250.

At step 1210, a current display mode of a display at a display end is determined, wherein the current display mode is one of at least two display modes of the display, and each of the at least two display modes indicates definition information related to resolution of an image to be displayed on the display at the display end. In this embodiment, the display has at least two display modes. The current display mode can be selected according to the needs of the viewer, or the display mode may be automatically adjusted according to the current display condition (e.g., whether a lag occurs, etc.).

In some embodiments, each of the at least two display modes comprises one of a full definition display mode and a high-low definition display mode. In the full definition display mode, each frame image displayed on the display at the display end has full definition resolution in the entire image region. For example, each frame of an image has a global resolution of 4K in the entire image region. In the high-low definition display mode, each frame image displayed on the display at the display end comprises a first image region with high resolution and a second image region with low resolution. For example, in an image including a face, the resolution of the face region is high resolution of 4 k, while the resolution of the non-face region is low resolution of 1 k. There may be one or more full definition display modes and/or one or more high-low definition display modes. In the case where there are at least two full definition display modes, the full definition resolutions in the at least two full definition display modes are different from each other. In the case where there are at least two high-low definition display modes, the resolution group consisting of high resolution and low resolution in each high-low definition display mode is different from the resolution group consisting of high resolution and low resolution in each of the at least one other high-low definition display mode.

As an example, there are three display modes, a full definition display mode with a global resolution of 4 k (which may be referred to as a full HD (High Definition) mode or a first full definition display mode), a full definition resolution with a global resolution of 1 k (which may be referred to as a full low definition mode or a second full definition display mode), and a high-low definition display mode (for example, the resolution of the face region is 4 k, while the resolution of the non-face region is 1 k, which may be referred to as a high-low definition mode).

Figures 13, 14, 15:
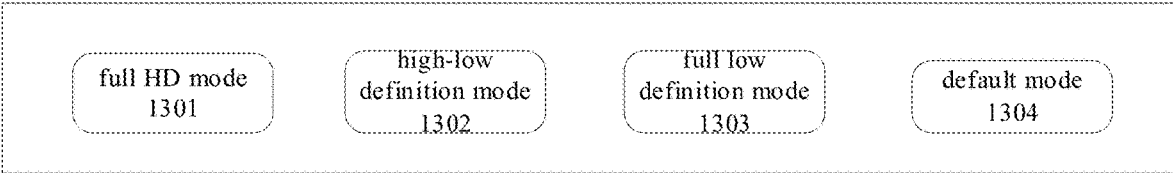
FIG. 13 illustrates a schematic diagram of a display interface for selecting a display mode of a display according to an embodiment of the present disclosure.
FIG. 14 illustrates a schematic diagram of a display interface for selecting a high-low definition display mode of a display according to an embodiment of the present disclosure.
FIG. 15 illustrates a schematic diagram of setting a display mode and definition information according to an embodiment of the present disclosure.

As an example, the display mode may be selected by the user or the viewer when the display is turned on or the corresponding display mode setting software is started. FIG. 13 illustrates a schematic diagram of a display interface for selecting a display mode of a display according to an embodiment of the present disclosure. As shown in FIG. 13, the display interface includes a full HD mode 1301, a high-low definition mode 1302, and a full low definition mode 1303, and optionally includes a default mode 1304. When the default mode is selected, the display mode selected by the user last time is selected, which is essentially one of the full HD mode, the high-low definition mode, and the full low definition mode.

As an example, there may also be three high-low definition display modes, such as a first high-low definition display mode, a second high-low definition display mode, and a third high-low definition display mode. In the first high-low definition display mode, the high resolution is 4 k and the low resolution is 1 k. In the second high-low definition display mode, the high resolution is 3 k and the low resolution is 1 k. In the third high-low definition display mode, the high resolution is 2 k and the low resolution is 1 k.

As an example, the high-low definition display mode can be selected by the user (for example, selecting the high-low definition mode 1302). FIG. 14 illustrates a schematic diagram of a display interface for selecting a high-low definition display mode of a display according to an embodiment of the present disclosure. As shown in FIG. 14, the display interface includes a first high-low definition display mode 1401, a second high-low definition display mode 1402, and a third high-low definition display mode 1403, and optionally includes a default high-low definition display mode 1404. When selecting the default high-low definition display mode, the high-low definition display mode selected by the user last time is selected, which is essentially one of the first high-low definition display mode, the second high-low definition display mode, and the third high-low definition display mode.

In some embodiments, the at least two display modes may include all the modes described above, namely, the first full definition display mode, the second full definition display mode, the first high-low definition display mode, the second high-low definition display mode, and the third high-low definition display mode. The full definition resolution in the first full definition display mode is greater than the full definition resolution in the second full definition display mode. The high resolution in the first high-low definition display mode is greater than the high resolution in the second high-low definition display mode, and the high resolution in the second high-low definition display mode is greater than the high resolution in the third high-low definition display mode.

In some embodiments, the definition information in each display mode can be set or defined as needed. In this case, when determining the current display mode of the display at the display end, multiple options can be presented on the display interface of the display at the display end, wherein under a respective option of the multiple options, the target display mode corresponding to the respective option and the corresponding definition information under the target display mode are enabled to be defined, wherein, under the condition that the target display mode is a full definition display mode, the corresponding definition information comprises full definition resolution, and under the condition that the target display mode is a high-low definition display mode, the corresponding definition information comprises a first image region with high resolution and a second image region with low resolution. After a target option is confirmed from the multiple options, the target display mode corresponding to the target option is determined as the current display mode of the display at the display end.

As an example, FIG. 15 illustrates a schematic diagram of setting a display mode and definition information according to an embodiment of the present disclosure. As shown in FIG. 15, when an option is selected on the display interface, a full definition display mode can be defined under the option, and multiple options 1-N are presented, each of which represents a kind of definition information. For example, option 1 indicates that the horizontal resolution of the image displayed on the display of the display end is H, and the vertical resolution of the image is V; number 2 indicates that the horizontal resolution of the image displayed on the display of the display end is H/2, and the vertical resolution of the image is V/2; and so on. The values of the resolution here are just examples, and the specific values of the resolution can also be directly entered, which are not limited.

Figure 16:
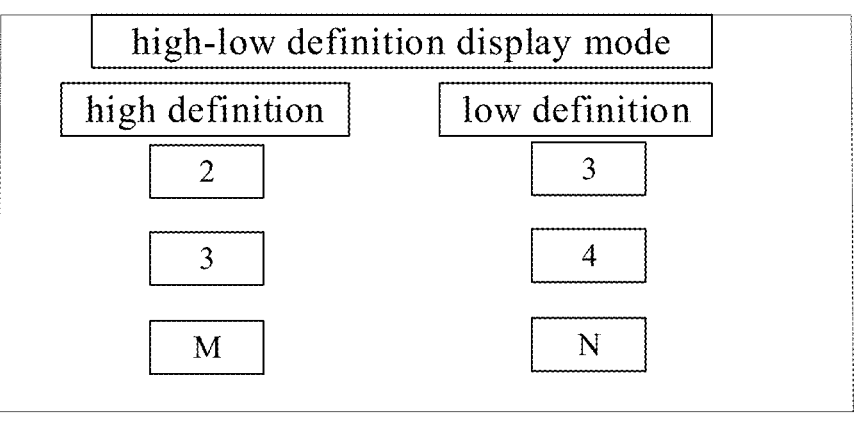
FIG. 16 illustrates a schematic diagram of setting a display mode and definition information according to an embodiment of the present disclosure.

As an example, FIG. 16 illustrates a schematic diagram of setting a display mode and definition information according to an embodiment of the present disclosure. As shown in FIG. 16, when an option is selected on the display interface, a high-low definition display mode can be defined under the option, and multiple high definition options 2-M and low definition options 3-N are presented, wherein each of the high definition options on the left represents the high resolution of the first image region, and each of the low definition options on the right represents the low resolution of the second image region. For example, the option 2 of the high definition options indicates that the horizontal resolution of the first image region displayed on the display of the display end is H/2, and the vertical resolution of the first image region is V/2; the option 3 of the low definition options indicates that the horizontal resolution of the second image region displayed on the display of the display end is H/3, and the vertical resolution of the second image region is V/3; and so on. The values of the resolution here are just examples, and specific values of the resolution can also be directly entered for setting, which are not limited.

At step 1220, multiple current frame color images of a scene at the acquisition end are obtained according to the current display mode through multiple image acquisition devices at the acquisition end at multiple different viewing angles of the scene at the acquisition end. In some embodiments, one or more of the multiple image acquisition devices are cameras, and the camera can, for example, acquire images of various resolutions as needed.

Figure 17A:
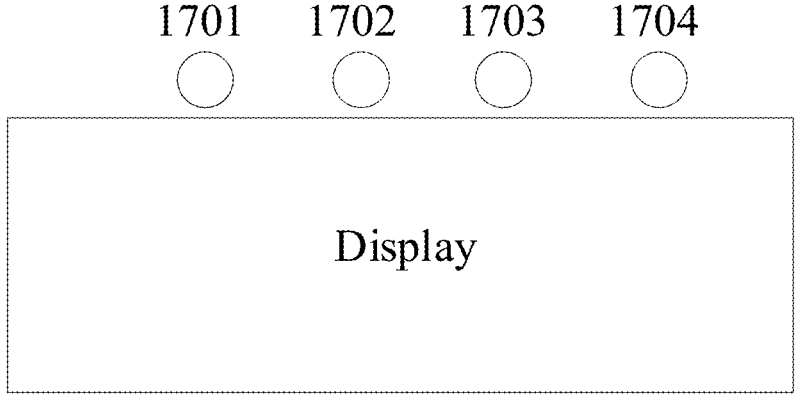
FIG. 17A-17C show the arrangement diagrams of the first image acquisition device, the second image acquisition device, the third image acquisition device and the fourth image acquisition device according to an embodiment of the present disclosure.
Figure 17B:
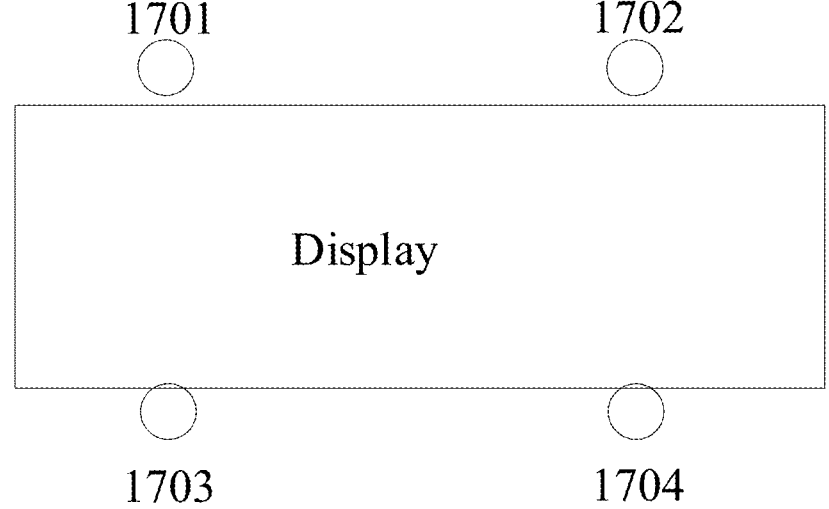
Figure 17C:
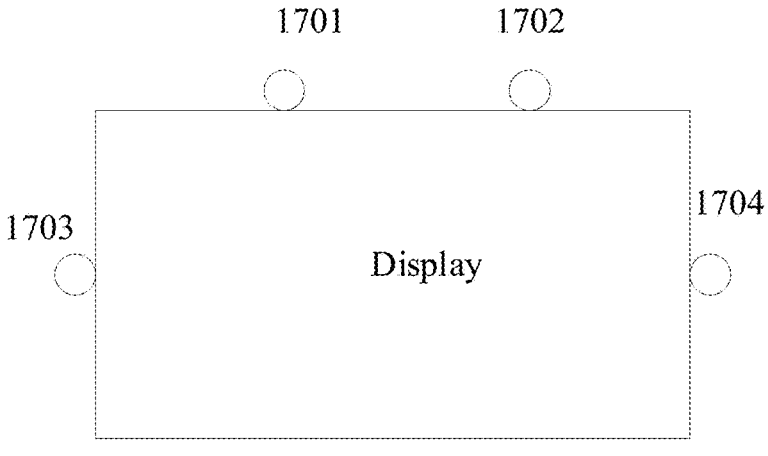

It should be noted that the multiple image acquisition devices at the acquisition end can be arranged at the acquisition end in any suitable manner to acquire images of the scene of the acquisition end. The image acquisition areas of the multiple image acquisition devices generally include overlapping areas. A number of multiple image acquisition devices is not fixed. The more the number of image acquisition devices, the better the display effect, but the greater the data and cost generated. In some embodiments, the number of the multiple image acquisition devices is four, which can reduce system cost and redundancy as well as resource occupation and consumption while achieving a better display effect. In addition, the multiple current frame color images are images at the same time. In some embodiments, according to the current display mode, multiple current frame color images for the scene of the acquisition end can be obtained through the first, second, third and fourth image acquisition devices that are arranged in sequence and at equal intervals along a horizontal edge of the display at the acquisition end. FIG. 17A shows the arrangement diagram of the first image acquisition device 1701, the second image acquisition device 1702, the third image acquisition device 1703 and the fourth image acquisition device 1704 in this case. In another embodiment, according to the current display mode, the multiple current frame color images of the scene can be obtained through a first acquisition device and a second image acquisition device arranged along one horizontal edge of the display at the acquisition end, and a third acquisition device and a fourth image acquisition device arranged along the other horizontal edge of the display at the acquisition end. FIG. 17B shows the arrangement diagram of the first image acquisition device 1701, the second image acquisition device 1702, the third image acquisition device 1703 and the fourth image acquisition device 1704 in this case. In another embodiment, according to the current display mode, the multiple current frame color images of the scene can be acquired through a first acquisition device and a second image acquisition device arranged along a horizontal edge of the display at the acquisition end, a third image acquisition device along one vertical edge of the display at the acquisition end, and a fourth image acquisition device along the other vertical edge of the display at the acquisition end. FIG. 17C shows the arrangement diagram of the first image acquisition device 1701, the second image acquisition device 1702, the third image acquisition device 1703, and the fourth image acquisition device 1704 in this case.

In some embodiments, the current display mode is a full definition display mode. In this case, when multiple current frame color images of a scene at the acquisition end are obtained according to the current display mode through multiple image acquisition devices at the acquisition end at multiple different viewing angles of the scene at the acquisition end, the multiple current frame color images with the full definition resolution at the multiple different viewing angles can be obtained through the multiple image acquisition devices at the acquisition end. Each image acquisition device can obtain a current frame color image at one viewing angle. As an example, the four image acquisition devices shown in FIG. 17A can obtain four current frame color images with full definition resolution at four viewing angles.

In some embodiments, the current display mode is a high-low definition display mode. In this case, when multiple current frame color images of a scene at the acquisition end are obtained according to the current display mode through multiple image acquisition devices at the acquisition end at multiple different viewing angles of the scene at the acquisition end, for each of the multiple different perspectives, a region image with the high resolution and a color image with the low resolution for the current frame are obtained through a respective image acquisition device among the multiple image acquisition devices at the acquisition end as a current frame color image, wherein a corresponding position of the region image with the high resolution in the color image with the low resolution is the same as a corresponding position of the first image region in said each frame image. As an example, the four image acquisition devices shown in FIG. 17A can acquire images at four viewing angles. At the viewing angle corresponding to the image acquisition device 1701, a face region image with resolution of 4K (i.e., a region image with the high resolution) and a full region image with resolution of 1 k (i.e., a color image with the low resolution) for the current frame are obtained through the image acquisition device 1701. The full region image also includes a low resolution face region, and the corresponding position of the face region image in the full region image is the same as the corresponding position of the first image region (i.e., in the high-low definition display mode, the first image region with the high resolution in each frame of the image displayed by the display at the display end) in said each frame image.

In some embodiments, obtaining a region image with the high resolution and a color image with the low resolution for the current frame through a respective image acquisition device among the multiple image acquisition devices at the acquisition end comprises: obtaining the color image with the high resolution through the respective image acquisition device among the multiple image acquisition devices at the acquisition end; obtaining the region image with the high resolution and the color image with the low resolution based on the color image with the high resolution. For example, the region image with the high resolution can be cropped from the color image with the high resolution, and the color image with the high resolution can be globally sampled to obtain the color image with the low resolution.

At step 1230, current frame depth maps at the locations of at least three image acquisition devices among the multiple image acquisition devices are determined based on the multiple current frame color images, so as to obtain current frame depth information for the scene. It should be noted that the more depth maps there are, the better the display effect, but the greater the data and cost generated. As an example, the current frame depth maps at the locations of the at least three image acquisition devices can be superimposed to obtain the current frame depth information for the scene, but this is not restrictive.

Figure 18:
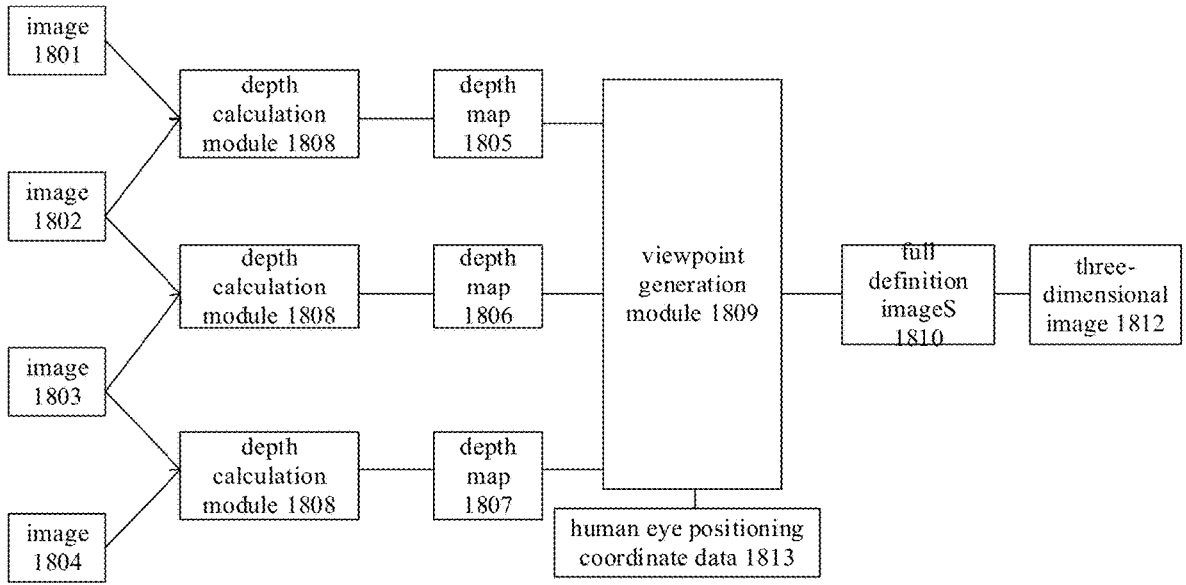
FIG. 18 illustrates a schematic diagram of displaying an image in a full definition display mode according to an embodiment of the present disclosure.

Taking the four image acquisition devices shown in FIG. 17A as an example, FIG. 18 illustrates a schematic diagram of displaying an image in a full definition display mode according to an embodiment of the present disclosure. Assume that the image acquired by image acquisition device 1701 is image 1801, the image acquired by image acquisition device 1702 is image 1802, the image acquired by image acquisition device 1703 is image 1803, and the image acquired by image acquisition device 1704 is image 1804. As shown in FIG. 18, a depth map 1805 at the location of the image acquisition device 1701 can be determined based on images 1801 and 1802, a depth map 1806 at the location of the image acquisition device 1702 can be determined based on images 1802 and 1803, and a depth map 1807 at the location of the image acquisition device 1703 can be determined based on images 1803 and 1804. The depth maps can be obtained using a depth calculation module 1808, which can be, for example, any suitable deep learning network or other algorithm model. Of course, this is only exemplary. In fact, the depth map at the location of the image acquisition device 1701 can also be calculated based on images 1801 and 1803, which is not restrictive. Then, the three depth maps can be superimposed to obtain the depth information for the scene.

In some embodiments, the current display mode is a high-low definition display mode. Thus, determining current frame depth maps at the locations of at least three image acquisition devices among the multiple image acquisition devices based on the multiple current frame color images, so as to obtain current frame depth information for the scene, comprises: determining at least three first depth maps for the region images with the high resolution and at least three second depth maps for the color images with the low resolution at the locations of at least three of the multiple image acquisition devices according to the region images with the high resolution and the color images with the low resolution in the multiple current frame color images, respectively; determining the first depth information for the region images with the high resolution and the second depth information for the color images with the low resolution according to the at least three first depth maps and the at least three second depth maps, respectively, as the current frame depth information for the scene.

Figures 19, 20:
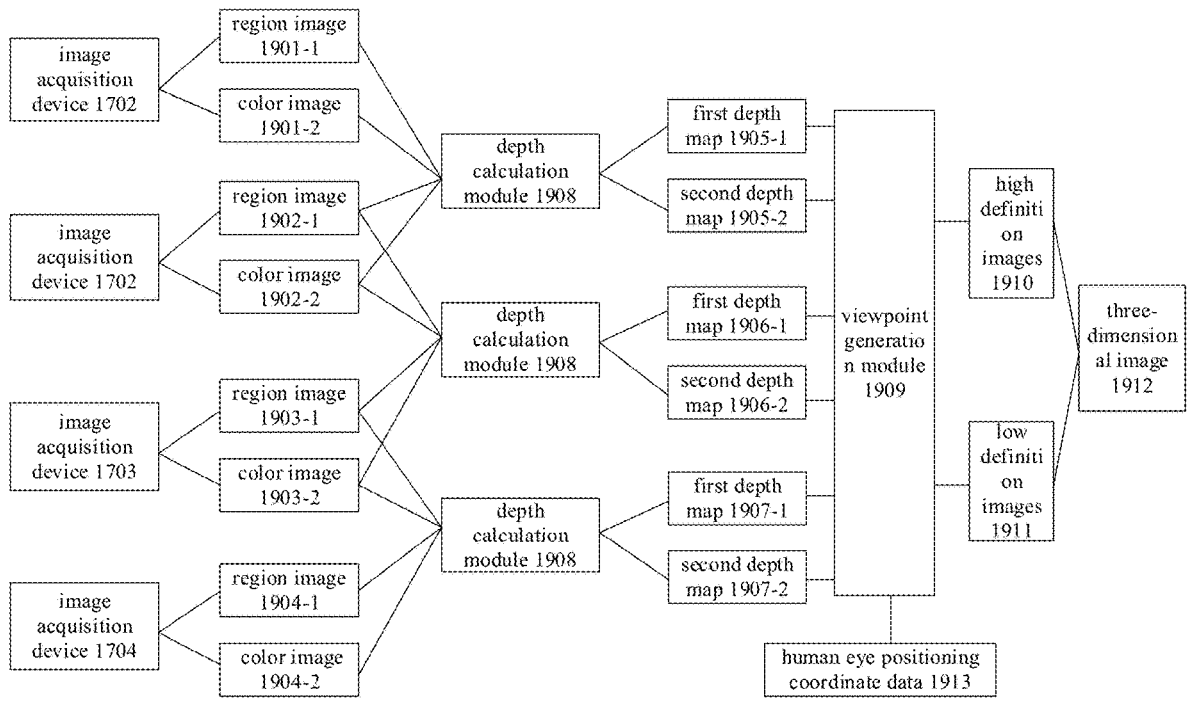
FIG. 19 illustrates a schematic diagram of displaying an image in a high-low definition display mode according to an embodiment of the present disclosure.
FIG. 20 shows a schematic diagram for detecting display performance according to an embodiment of the present disclosure.

Taking the four image acquisition devices shown in FIG. 17A as an example, FIG. 19 illustrates a schematic diagram of displaying an image in a high-low definition display mode according to an embodiment of the present disclosure. Assume that the images obtained through the image acquisition device 1701 are a region image 1901-1 with the high resolution and a color image 1901-2 with the low resolution, the images obtained through the image acquisition device 1702 are a region image 1902-1 with the high resolution and a color image 1902-2 with the low resolution, the images obtained through the image acquisition device 1703 are a region image 1903-1 with the high resolution and a color image 1903-2 with the low resolution, and the images obtained through the image acquisition device 1704 are a region image 1904-1 with the high resolution and a color image 1904-2 with the low resolution. As shown in FIG. 19, a first depth map 1905-1 for the region image with the high resolution at the location of the image acquisition device 1701 can be determined based on the region images 1901-1 and 1902-1 with the high resolution, and a second depth map 1905-2 for the color image with the low resolution at the location of the image acquisition device 1701 can be determined based on the color images 1901-2 and 1902-2 with the low resolution. Similarly, the first depth map 1906-1 for the region image with the high resolution and the second depth map 1906-2 for the color image with the low resolution at the location of the image acquisition device 1702, as well as the first depth map 1907-1 for the region image with the high resolution and the second depth map 1907-2 for the color image with the low resolution at the location of the image acquisition device 1703 can also be obtained. The first depth maps and the second depth maps can be obtained using the depth calculation module 1908, and the depth calculation module can be, for example, any suitable deep learning network or other algorithm model. Of course, this is only exemplary. In fact, the first and second depth maps at the location of the image acquisition device 1701 can also be calculated based on the images 1901-1 and 1903-1, and 1901-2 and 1903-2, which is not restrictive. Then, the first depth maps can be superimposed to obtain the first depth information for the scene, and the second depth maps can be superimposed to obtain the second depth information for the scene as the current frame depth information for the scene.

At step 1240, a left-eye viewpoint map and a right-eye viewpoint map corresponding to human eye positioning coordinate data in a display space of the display at the display end are generated based on the current frame depth information, the current frame color images obtained through the at least three image acquisition devices and the human eye positioning coordinate data of the viewer at the display end, wherein the human eye positioning coordinate data comprises the coordinates of the left eye and the right eye of the viewer in the display space at the display end. As shown in FIGS. 18 and 19, the viewpoint generation modules 1809 and 1909 can be used to generate the left-eye viewpoint map and the right-eye viewpoint map. In the full definition display mode, the left-eye viewpoint map and the right-eye viewpoint map (referred to as full definition images 1810) with full definition resolution will be generated based on the current frame depth information, the current frame color images obtained through the at least three image acquisition devices and the human eye positioning coordinate data 1813. In the high-low definition display mode, the left-eye viewpoint map and the right-eye viewpoint map with the high resolution (referred to as high definition images 1910) and the left-eye viewpoint map and the right-eye viewpoint map with the low resolution (referred to as low definition images 1911) will be generated.

In some embodiments, in the high definition and low definition display modes, a left-eye viewpoint map and a right-eye viewpoint map with the high resolution corresponding to the eye positioning coordinate data in the display space are generated based on the first depth information, the region images with high-resolution obtained through the at least three image acquisition devices, and the eye positioning coordinate data of the viewer at the display end; a left-eye viewpoint map and a right-eye viewpoint map with the low resolution corresponding to the eye positioning coordinate data in the display space are generated based on the second depth information, the color images with the low resolution obtained through the at least three image acquisition devices, and the eye positioning coordinate data of the viewer at the display end.

As an example, the first depth information described with reference to FIG. 19, the region images 1901-1, 1902-1, 1903-1 with the high resolution, and the human eye positioning coordinate data can be input into the viewpoint generation module 1909 to obtain the left-eye viewpoint map and the right-eye viewpoint map with the high resolution. The second depth information described with reference to FIG. 19, the color image 1901-2, 1902-2, 1903-2 with the low resolution, and the human eye positioning coordinate data 1913 can be input into the viewpoint generation module 1909 to obtain the left-eye viewpoint map and the right-eye viewpoint map with the low resolution.

At step 1250, the generated left-eye viewpoint map and the right-eye viewpoint map are synthesized into a three-dimensional image (as shown by the reference number 1812 and 1912 in FIGS. 18 and 19) for display on the display at the display end. The synthesis of the generated left-eye viewpoint map and the right-eye viewpoint map into a three-dimensional image can be realized, for example, by a synthesis 3D image module, which can be any suitable deep learning network or other algorithm model.

In some embodiments, when the current display mode is a high-low definition display mode, the left-eye viewpoint map and the right-eye viewpoint map with the high resolution, and the left-eye viewpoint map and the right-eye viewpoint map with the low resolution can be synthesized into a three-dimensional image for display on the display of the display end.

In the display method according to the embodiment of the present disclosure, the current display mode of the display at the display end is determined from at least two display modes, and multiple current frame color images of the scene at the acquisition end are obtained through the image acquisition devices at the acquisition end according to the definition information indicated by the current display mode, and then the current frame depth maps at the locations of at least three image acquisition devices of the multiple image acquisition devices are determined according to the multiple current frame color images, so as to obtain the current frame depth information for the scene, and finally based on the current frame depth information, the current frame color images obtained through the at least three image acquisition devices and the human eye positioning coordinate data of the viewer at the display end, the left-eye viewpoint map and the right-eye viewpoint map corresponding to the human eye positioning coordinate data in the display space of the display at the display end are generated. In this way, the display mode of the display at the display end can be flexibly determined, and by using the current frame depth maps at the locations of the at least three of the multiple image acquisition devices and the obtained current frame color image, it is possible to greatly reduce the lag and frame loss caused by insufficient performance of the processor performing image processing, thereby improving the efficiency and experience of 3D video calls.

In some embodiments, as the data flow increases, the current display mode may not be suitable. In an embodiment of the present disclosure, a performance detection model can be used to determine whether the current display mode is suitable, that is, to detect whether the display performance in the current display mode is suitable. FIG. 20 shows a schematic diagram for detecting display performance according to an embodiment of the present disclosure. As shown in FIG. 20, at block 2001, mode selection is performed. As an example, the current display mode can be selected from the first full definition display mode (e.g., full HD mode) at block 2002, the first high-low definition display mode at block 2003, the second high-low definition display mode at block 2004, the third high-low definition display mode at block 2005, and the second full definition display mode (full low definition mode) at block 2006 as shown in FIG. 20. Then, the display performance in the current display mode is detected at block 2007 to determine whether the current display mode is suitable. If it is not suitable, the current display mode can be changed accordingly at block 2008.

FIG. 21 illustrates an exemplary flowchart of a display method 2100 according to an embodiment of the present disclosure. The method 2100, in addition to steps 1210-1250 described with reference to FIG. 12, also includes steps 1260-1290 to handle situations where the current display mode is not suitable.

At step 1260, the total time consumed for image processing in the current display mode is determined, wherein the total time consumed for image processing comprises a sum of the time for obtaining the current frame depth information for the scene, the time for generating the left-eye viewpoint map and the right-eye viewpoint map corresponding to human eye positioning coordinate data in the display space, and the time for synthesizing the generated left-eye viewpoint map and the right-eye viewpoint map into the three-dimensional image.

At step 1270, in response to the total time consumed for image processing in the current display mode being greater than a time consumption threshold, at least one display mode from the at least two display modes whose total time consumed for image processing is less than the total time consumed for image processing in the current display mode is obtained, wherein the time consumption threshold depends on the refresh rate of the display at the display end in the current display mode. Generally, the display frame rate is 60 frames per second, and for videos, if the display frame rate is greater than 24 frames per second, and people will feel the smoothness of the video. The minimum threshold here is greater than 1000/24 ms. If the performance is not enough, and the full HD mode is still selected, people will feel a more obvious sense of lag and delay, which is not smooth and affects the experience.

At step 1280, the display mode with the greatest total time consumed for the image processing is determined from the at least one display mode as a candidate mode for the current display mode for presentation. In this way, the best quality of the displayed image can be guaranteed while ensuring smooth display. As shown in FIG. 22, when it is detected that the total image processing time in the current display mode is greater than the time threshold, information can be presented on the display interface to recommend the candidate mode.

At step 1290, in response to a confirmation of the candidate mode, the candidate mode is determined as the current display mode of the display at the display end. After the user confirms the recommended candidate mode, the candidate mode will become a new current display mode. Then, the method can continue to return to step 1210 for execution.

As an example, assuming that the first full definition display mode (e.g., full HD mode) 2002, the first high-low definition display mode 2003, the second high-low definition display mode 2004, the third high-low definition display mode 2005, and the second full definition display mode (full low definition mode) 2006 in FIG. 20 are sequentially reduced in terms of total time consumption, when the current display mode is the first full definition display mode and a lag occurs, the display mode (e.g., the second high-low definition display mode 2004) with a total time consumption less than the time consumption threshold and the largest total time consumption can be selected from the other four modes as a candidate mode for presentation.

In this way, when the system processor performance is insufficient, the system will automatically detect and timely discover it and feedback a recommended mode. After the user uses recommended mode, the system can display normally, solving the flag, frame loss, increase of end-to-end delay and other problems that may be encountered above.

Taking a full definition display mode with a first full definition resolution and a high-low definition display mode with a first high definition resolution and a first low definition resolution as examples, where the first full definition resolution is equal to the first high definition resolution, the inventor tested the performance of the video communication system in the two display modes. The delay data and the resource consumption data of the video communication system were tested respectively. The test environment is: CPU: I9-10920X; GPU: RTX4090 (24G); memory: 16G DDR4/3200 MHZ*4; 4 full HD cameras, and the frame rate of each camera is 60 Hz.

In the case where the display mode is the full definition display mode, the average delay from the acquisition end to the display end of the video communication system is 122 ms; wherein a sum of the time taken for the four cameras to acquire data, the time taken for the acquired data to be transmitted to the terminal device, and the time taken to wait for the next data collection to start is 20 ms, the time taken to transfer the data from the memory to the GPU is 13 ms, the time taken to convert the data into RGB data is 15 ms, the time taken for image processing (such as background removal, cropping and stretching, etc.) is 6 ms, the time taken to encode the image data is 5 ms, and the time taken to transmit the encoded data from the GPU to the memory is 1 ms, the time taken to transfer the encoded data to the terminal device at the display end is 2 ms, the time taken for the terminal device at the display end to transfer the encoded data from a memory to a GPU is 1 ms, the time taken for the terminal device to decode the encoded data is 5 ms, the time taken to perform three-dimensional reconstruction on the decoded data is 28 ms, the time taken to splice the left-eye viewpoint map and the right-eye viewpoint map generated by three-dimensional reconstruction into a large image is 1 ms, and the time taken to synthesize the large image into a three-dimensional image and send it to the display for display is 25 ms.

Figure 23:
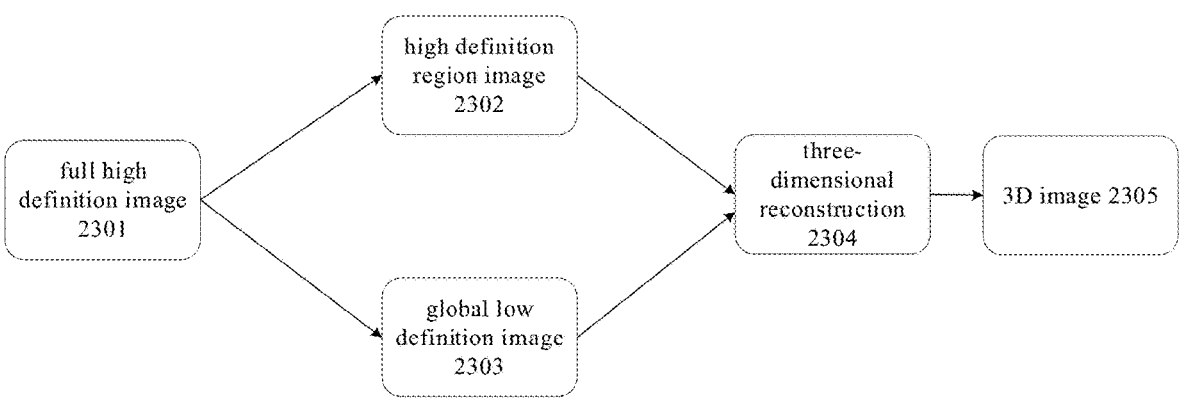
FIG. 23 illustrates a schematic diagram of obtaining a three-dimensional image when the display mode is in a high-low definition display mode.

In the case where the display mode is the high-low definition display mode, as shown in FIG. 23, each camera acquires full high definition image 2301. High definition region (e.g. face region) image (i.e., region image with the high resolution) 2302 at the same resolution can be obtained from the full high definition image 2301, and global sampling can be performed on the full high definition image 2301 to extract global low definition image 2303 with lower resolution (i.e., color image with the low resolution), which can be achieved by the camera or other terminal device. The algorithm performs three-dimensional reconstruction 2304 on the high definition region image and the global low definition image data respectively to obtain a 3D image 2305. The test results show that the average delay from the acquisition end to the display end of the video communication system has dropped to 94 ms; wherein a sum of the time taken for the four cameras to acquire data, the time taken for the acquired data to be transmitted to the terminal device, and the time taken to wait for the next data collection to start is 20 ms, the time taken to transfer the data from the memory to the GPU is 13 ms, the time taken to convert the data into RGB data is 15 ms, the time taken for image processing (such as background removal, cropping and stretching, etc.) is 6 ms, the time taken to encode the image data is 1.5 ms, and the time taken to transmit the encoded data from the GPU to the memory is 0.5 ms, the time taken to transfer the encoded data to the terminal device at the display end is 1 ms, the time taken for the terminal device at the display end to transfer the encoded data from a memory to a GPU is 0.5 ms, the time taken for the terminal device to decode the encoded data is 1.5 ms, the time taken to perform three-dimensional reconstruction on the decoded data is 9 ms, the time taken to splice the left-eye viewpoint map and the right-eye viewpoint map generated by three-dimensional reconstruction into a large image is 1 ms, and the time taken to synthesize the large image into a three-dimensional image and send it to the display for display is 25 ms.

It can be seen that the average delay from the acquisition end to the display end of the video communication system in the high-low definition display mode is reduced by about 23% compared with the average delay in the full high definition display mode.

The inventor also tested the resource consumption in the two display modes under the same test environment. The table below shows the usage of various resources in the two modes, with a focus on the usage of GPU computing resources by the 3D reconstruction algorithm. As shown in the cuda column in the table below, 60% of cuda resources are consumed in the full high definition display mode, while only 28% of cuda resources are consumed in the high-low definition display mode.

shown, the computing device 2410 may also comprise a system bus or other data and command transmission systems that couple various components to one another. The system bus may include any one or a combination of different bus structures, such as a memory bus or memory controller, a peripheral bus, a universal serial bus, and/or a processor utilizing any one of the various bus architectures, or a local bus. Various other examples are also contemplated, such as control and data lines.

The processing system 2411 represents functionality of using hardware to perform one or more operations. Accordingly, the processing system 2411 is illustrated as including a hardware element 2414 that may be configured as a processor, a functional block, and the like. This may include implementation in hardware as an application specific integrated circuit or other logic devices formed using one or more semiconductors. The hardware element 2414 is not limited by the material from which it is formed or the processing mechanisms employed therein. For example, a processor may be composed of semiconductor(s) and/or transistors (e.g., electronic integrated circuits (ICs)). In such context, processor-executable instructions may be electronically executable instructions.

The computer-readable medium 2412 is illustrated as including a memory/storage device 2415. The memory/storage device 2415 represents a memory/storage capacity associated with one or more computer-readable media. The memory/storage device 2415 may include a volatile medium (such as a random access memory (RAM)) and/or a non-volatile medium (such as a read-only memory (ROM), a flash memory, an optical disk, a magnetic disk, etc.). The memory/storage device 2415 may include a fixed medium (e.g., an RAM, an ROM, a fixed hard disc driver, etc.) as well as a removable medium (e.g., a flash memory, a removable hard disc driver, an optical disk, etc.). The computer-readable medium 2412 may be configured in various other ways further described below.

One or more I/O interfaces 2413 represent functionality of allowing a user to input commands and information to the computing device 2410 using various input devices and optionally further allowing information to be presented to the user and/or other components or devices using various

| Resource consumption | CPU | Memory | Cu-da | En-code | De-code | Sending on network | Receiving on network |
|---|---|---|---|---|---|---|---|
| Full definition display mode | 17% | 25% | 60% | 6% | 6% | 24.2 Mbps | 24.2 Mbps |
| High-low definition display mode | 13% | 21% | 28% | 2% | 2% | 5.5 Mbps | 5.5 Mbps |

Figure 24:
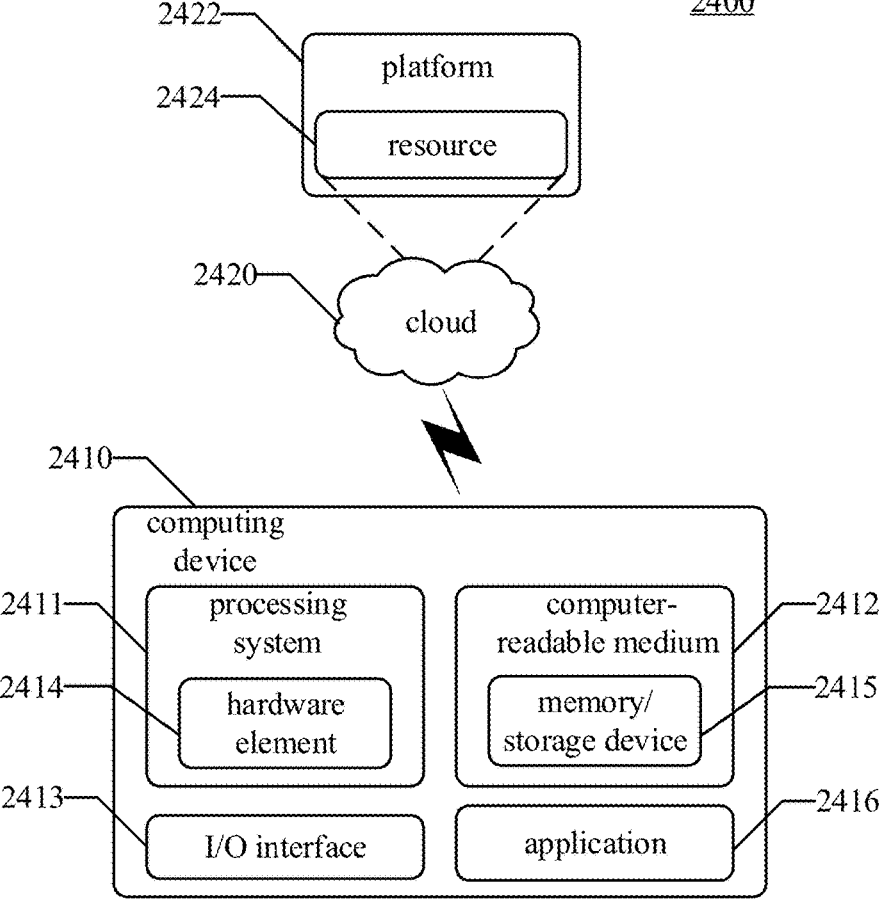
FIG. 24 illustrates an exemplary system comprising an exemplary computing device representative of one or more systems and/or devices that can implement various techniques described herein.

FIG. 24 illustrates an exemplary system 2400 comprising an exemplary computing device 2410 representative of one or more systems and/or devices that may implement various techniques described herein. The computing device 2410 may be, for example, a server of a service provider, a device associated with a server, a system on a chip, and/or any other suitable computing device or computing system.

The exemplary computing device 2410 as illustrated comprises a processing system 2411, one or more computer-readable media 2412, and one or more I/O interfaces 2413 communicatively coupled with each other. Although not output devices. Examples of input devices include keyboards, cursor control devices (e.g., mice), microphones (e.g., for voice input), scanners, touch function (e.g., configured as capacitive or other sensors for detecting physical touch), cameras (for example, motions that do not involve touch can be detected as gestures using visible or invisible wavelengths (such as infrared frequency), and so on. Examples of output devices include display devices (e.g., monitors or projectors), loudspeakers, printers, network cards, tactile-responsive devices, and so on. Accordingly, the computing device 2410 may be configured in various manners further described below so as to support user interaction.

The computing device 2410 further comprises an application 2416. The application 2416 may be, for example, a software instance of the video communication method 300, the video communication method 600 or the display method 1200 and, in combination with other elements in the computing device 2410, implement the techniques described herein.

Various techniques may be described herein in the general context of software, hardware elements, or program modules. Generally, these modules include routines, programs, objects, elements, components, data structures, etc. that perform specific tasks or implement specific abstract data types. As used herein, the terms "module", "function" and "component" generally denote software, firmware, hardware, or a combination thereof. The techniques described herein are characterized by being platform-independent, which means that these techniques can be implemented on a variety of computing platforms with a variety of processors.

Implementations of the described modules and techniques may be stored in or transmitted across computer-readable media in certain forms. The computer-readable media may include a variety of media that can be accessed by the computing device 2410. By way of example, and not limitation, the computer-readable media may include "computer-readable storage media" and "computer-readable signal media".

As opposed to mere signal transmission, a carrier wave or a signal itself, the "computer-readable storage medium" refers to a medium and/or device capable of storing information persistently, and/or a tangible storage device. Therefore, computer-readable storage media refers to non-signal carrying media. Computer-readable storage media include, for example, volatile and nonvolatile, removable and non-removable media and/or hardware such as storage devices implemented with methods or techniques suitable for information storage (such as computer-readable instructions, data structures, program modules, logic elements/circuits or other data). Examples of computer-readable storage media may include, but are not limited to, an RAM, an ROM, an EEPROM, a flash memory or other memory technology, a CD-ROM, a digital versatile disk (DVD) or other optical storage devices, a hard drive, a cassette, a magnetic tape, a magnetic disk storage device or other magnetic storage devices, or other storage devices, a tangible medium, or a product suitable for storing the desired information and accessible by a computer.

The "computer-readable signal medium" refers to a signal carrying medium configured as hardware to transmit instructions to the computing device 2410, such as via a network. Signal media may typically embody computer readable instructions, data structures, program modules or other data in modulated data signals such as a carrier wave, a data signal, or other transmission mechanisms. Signal media further include any information delivery medium. The term "modulated data signal" refers to a signal in which one or more of the characteristics of the signal are set or changed to encode information into the signal. By way of example, and not limitation, communication media include wired media, such as a wired network or direct wiring, and wireless media, such as acoustic, RF, infrared, and other wireless media.

As described previously, hardware elements 2414 and computer-readable media 2412 represent instructions, mod-ules, programmable device logics, and/or fixed device logics implemented in hardware that, in some embodiments, may be used to implement at least some aspects of the techniques described herein. Hardware elements may include an integrated circuit or system on a chip, an application specific integrated circuit (ASIC), a field programmable gate array (FPGA), a complex programmable logic devices (CPLD), and other implementations in silicon or components of other hardware devices. In such a context, a hardware element may serve as a processing device for performing program tasks defined by the instructions, modules, and/or logics embodied by the hardware element, as well as a hardware device for storing instructions for execution, e.g., a computer-readable storage medium previously described.

Combinations of the foregoing may also be used to implement the various techniques and modules described herein. Therefore, software, hardware, or program modules and other program modules may be implemented as one or more instructions and/or logics embodied on computer-readable storage medium in certain forms and/or embodied by one or more hardware elements 2414. The computing device 2410 may be configured to implement specific instructions and/or functions corresponding to software and/or or hardware modules. Thus, modules may be implemented, at least in part, in hardware, as modules executable by the computing device 2410 as software, for example, using computer-readable storage media and/or hardware elements 2414 of the processing system. Instructions and/or functions may be executable/operable by one or more products (for example, one or more computing devices 2410 and/or processing systems 2411) so as to implement the techniques, modules, and examples described herein.

In various implementations, the computing device 2410 may employ a variety of different configurations. For example, the computing device 2410 may be implemented as a computer-type device including a personal computer, a desktop computer, a multi-screen computer, a laptop computer, a netbook, and the like. The computing device 2410 may also be implemented as a mobile device-type device including a mobile device such as a mobile phone, a portable music player, a portable gaming device, a tablet computer, a multi-screen computer, and the like. The computing device 2410 may also be implemented as a television-type device, which includes a device having or being connected to a generally larger screen in a casual viewing environment. These devices include televisions, set-top boxes, game consoles, and the like.

The techniques described herein may be supported by these various configurations of the computing device 2410 and are not limited to specific examples of the techniques described herein. Functionality may also be implemented in whole or in part on a "cloud" 2420 by using a distributed system, such as through a platform 2422 described below.

The cloud 2420 includes and/or represents a platform 2422 for resources 2424. The platform 2422 abstracts the underlying functionality of the hardware (e.g., server) and software resources of the cloud 2420. The resources 2424 may include applications and/or data that may be used while performing computer processing on a server remote from the computing device 2410. The resources 2424 may also include services provided over the Internet and/or through subscriber networks such as cellular or Wi-Fi networks.

The platform 2422 can abstract resources and functionality to connect the computing device 2410 with other computing devices. The platform 2422 may also be used to abstract the hierarchy of resources to provide a corresponding level of hierarchy of requirements encountered for resources 2424 implemented via the platform 2422. Accordingly, in an interconnected device embodiment, implementation of the functionality described herein may be distributed throughout the system 2400. For example, functionality may be implemented in part on the computing device 2410 and through the platform 2422 that abstracts the functionality of the cloud 2420.

The present disclosure provides a computer-readable storage medium in which computer-readable instructions are stored. When executed, the computer-readable instructions implement any one of the methods described above.

The present disclosure provides a computer program product or computer program that includes computer instructions stored in a computer-readable storage medium. The processor of the computing device reads the computer instructions from the computer-readable storage medium, and the processor executes the computer instructions, so that the computing device performs any of the methods provided in the above various optional implementations.

It should be understood that, for clarity, embodiments of the present disclosure have been described with reference to different functional units. However, it will be apparent that the functionality of each functional unit may be implemented in a single unit, in a plurality of units or as part of other functional units without departing from the present disclosure. For example, functionality described as being performed by a single unit may be performed by multiple different units. Therefore, references to specific functional units are merely to be considered as references to appropriate units for providing the described functionality and are not intended to indicate strict logical or physical structures or organizations. Thus, the present disclosure may be implemented in a single unit, or may be physically and functionally distributed between different units and circuits.

It will be understood that, although the terms such as first, second and third may be used herein to describe various devices, elements, components or sections, these devices, elements, components or sections should not be limited by these terms. These terms are only used to distinguish one device, element, component or section from another device, element, component or section.

Although the present disclosure has been described in connection with some embodiments, it is not intended to be limited to the specific forms set forth herein. On the contrary, the scope of the present disclosure is limited only by the appended claims. Additionally, although individual features may be included in different claims, these features may possibly be advantageously combined, and the inclusion in different claims does not imply that a combination of features is not feasible and/or advantageous. The order of features in the claims does not imply any specific order in which the features must be operated. Furthermore, in the claims, the word "comprising" does not exclude other elements and the term "a" or "an" does not exclude a plurality. Reference signs in the claims are provided merely as clear examples and shall not be construed as limiting the scope of the claims in any way.

The invention claimed is:

1. A display method, comprising:
   determining a current display mode of a display at a display end, wherein the current display mode is one of at least two display modes of the display, and each of the at least two display modes indicates definition information related to resolution of an image to be displayed on the display at the display end;
   obtaining multiple current frame color images of a scene at an acquisition end according to the current display mode through multiple image acquisition devices at the acquisition end at multiple different viewing angles of the scene at the acquisition end;
   determining current frame depth maps at locations of at least three image acquisition devices among the multiple image acquisition devices based on the multiple current frame color images, so as to obtain current frame depth information for the scene;
   generating a left-eye viewpoint map and a right-eye viewpoint map corresponding to human eye positioning coordinate data in a display space of the display at the display end based on the current frame depth information, the current frame color images obtained through the at least three image acquisition devices and the human eye positioning coordinate data of a viewer at the display end, wherein the human eye positioning coordinate data comprises the coordinates of a left eye and a right eye of the viewer in the display space at the display end; and
   synthesizing the generated left-eye viewpoint map and the right-eye viewpoint map into a three-dimensional image for display on the display at the display end.

2. The method according to claim 1, wherein each of the at least two display modes comprises one of a full definition display mode and a high-low definition display mode,
   wherein, in the full definition display mode, each frame image displayed on the display at the display end has full definition resolution in an entire image region, and in the high-low definition display mode, each frame image displayed on the display at the display end comprises a first image region with high resolution and a second image region with low resolution, and
   wherein, in a case where there are at least two full definition display modes, the full definition resolutions in the at least two full definition display modes are different from each other, and
   wherein in a case where there are at least two high-low definition display modes, a resolution group consisting of high resolution and low resolution in each high-low definition display mode is different from a resolution group consisting of high resolution and low resolution in each of at least one other high-low definition display mode.

3. The method according to claim 2, wherein the current display mode is a full definition display mode, and wherein, obtaining multiple current frame color images of a scene at the acquisition end according to the current display mode through multiple image acquisition devices at the acquisition end at multiple different viewing angles of the scene at the acquisition end comprises:
   obtaining the multiple current frame color images with the full definition resolution at the multiple different viewing angles through the multiple image acquisition devices at the acquisition end.

4. The method according to claim 2, wherein the current display mode is a high-low definition display mode, and wherein, obtaining multiple current frame color images of a scene at the acquisition end according to the current display mode through multiple image acquisition devices at the acquisition end at multiple different viewing angles of the scene at the acquisition end comprises:
   for each of multiple different perspectives, obtaining a region image with the high resolution and a color image with the low resolution for the current frame through a respective image acquisition device among the multiple image acquisition devices at the acquisition end as a current frame color image, wherein a corresponding position of the region image with the high resolution in the color image with the low resolution is same as a corresponding position of the first image region in said each frame image.

5. The method according to claim 4, wherein obtaining a region image with the high resolution and a color image with the low resolution for the current frame through a respective image acquisition device among the multiple image acquisition devices at the acquisition end comprises:

obtaining the color image with the high resolution through the respective image acquisition device among the multiple image acquisition devices at the acquisition end; and obtaining the region image with the high resolution and the color image with the low resolution based on the color image with the high resolution.

6. The method according to claim 5, wherein determining current frame depth maps at the locations of at least three image acquisition devices among the multiple image acquisition devices based on the multiple current frame color images, so as to obtain current frame depth information for the scene, comprises:

determining at least three first depth maps for the regional images with the high resolution and at least three second depth maps for the color images with the low resolution at the locations of at least three of the multiple image acquisition devices according to the regional images with the high resolution and the color images with the low resolution in the multiple current frame color images, respectively; and determining a first depth information for the regional images with the high resolution and a second depth information for the color images with the low resolution according to the at least three first depth maps and the at least three second depth maps, respectively, as the current frame depth information for the scene.

7. The method according to claim 6, wherein generating a left-eye viewpoint map and a right-eye viewpoint map corresponding to human eye positioning coordinate data in a display space of the display at the display end based on the current frame depth information, the current frame color images obtained by the at least three image acquisition devices and the human eye positioning coordinate data of the viewer at the display end comprises:

generating a left-eye viewpoint map and a right-eye viewpoint map with the high resolution corresponding to the eye positioning coordinate data in the display space based on the first depth information, the regional images with high-resolution obtained through the at least three image acquisition devices, and the eye positioning coordinate data of the viewer at the display end; and generating a left-eye viewpoint map and a right-eye viewpoint map with the low resolution corresponding to the eye positioning coordinate data in the display space based on the second depth information, the color images with the low resolution obtained through the at least three image acquisition devices, and the eye positioning coordinate data of the viewer at the display end.

8. The method according to claim 7, wherein synthesizing the generated left-eye viewpoint map and the right-eye viewpoint map into a three-dimensional image for display on the display at the display end comprises:

synthesizing the left-eye viewpoint map and right-eye viewpoint map with the high resolution, and the left-eye viewpoint map and right-eye viewpoint map with the low resolution into a three-dimensional image for display on the display at the display end.

9. The method according to claim 2, wherein the at least two display modes comprise a first full definition display mode, a second full definition display mode, a first high-low definition display mode, a second high-low definition display mode, and a third high-low definition display mode, wherein, the full definition resolution in the first full definition display mode is greater than the full definition resolution in the second full definition display mode, and wherein the high resolution in the first high-low definition display mode is greater than the high resolution in the second high-low definition display mode, and the high resolution in the second high-low definition display mode is greater than the high resolution in the third high-low definition display mode.

10. The method according to claim 2, wherein determining a current display mode of a display at a display end comprises:

causing multiple options to be presented on a display interface of the display at the display end, wherein under a respective option of the multiple options, a target display mode corresponding to the respective option and the corresponding definition information under the target display mode are enabled to be defined, wherein, under a condition that the target display mode is a full definition display mode, the corresponding definition information comprises full definition resolution, and under a condition that the target display mode is a high-low definition display mode, the corresponding definition information comprises a first image region with high resolution and a second image region with low resolution; and in response to confirming a target option from the multiple options, determining the target display mode corresponding to the target option as the current display mode of the display at the display end.

11. The method according to claim 1, further comprising:

determining a total time consumed for image processing in the current display mode, wherein the total time consumed for image processing comprises a sum of the time for obtaining the current frame depth information for the scene, the time for generating the left-eye viewpoint map and the right-eye viewpoint map corresponding to human eye positioning coordinate data in the display space, and the time for synthesizing the generated left-eye viewpoint map and the right-eye viewpoint map into the three-dimensional image;

in response to the total time consumed for image processing in the current display mode being greater than a time consumption threshold, obtaining at least one display mode from the at least two display modes whose total time consumed for image processing is less than the total time consumed for image processing in the current display mode, wherein the time consumption threshold depends on a refresh rate of the display at the display end in the current display mode;

determining the display mode with the greatest total time consumed for image processing from the at least one display mode as a candidate mode for the current display mode for presentation; and in response to a confirmation of the candidate mode, determining the candidate mode as the current display mode of the display at the display end.

12. The method according to claim 1, wherein, obtaining multiple current frame color images of a scene at the acquisition end according to the current display mode through multiple image acquisition devices at the acquisition end at multiple different viewing angles of the scene at the acquisition end comprises:

according to the current display mode, obtaining the multiple current frame color images of the scene through a first acquisition device, a second acquisition device, a third acquisition device and a fourth image acquisition device that are arranged in sequence and at equal intervals along a horizontal edge of the display at the acquisition end.

13. The method according to claim 1, wherein, obtaining multiple current frame color images of a scene at the acquisition end according to the current display mode through multiple image acquisition devices at the acquisition end at multiple different viewing angles of the scene at the acquisition end comprises:

according to the current display mode, obtaining the multiple current frame color images of the scene through a first acquisition device and a second image acquisition device arranged along one horizontal edge of the display at the acquisition end, and a third acquisition device and a fourth image acquisition device arranged along the other horizontal edge of the display at the acquisition end.

14. The method according to claim 1, wherein, obtaining multiple current frame color images of a scene at the acquisition end according to the current display mode through multiple image acquisition devices at the acquisition end at multiple different viewing angles of the scene at the acquisition end comprises:

according to the current display mode, obtaining the multiple current frame color images of the scene through a first acquisition device and a second image acquisition device arranged along a horizontal edge of the display at the acquisition end, a third image acquisition device along one vertical edge of the display at the acquisition end, and a fourth image acquisition device along the other vertical edge of the display at the acquisition end.

15. The method according to claim 1, wherein at least one of the multiple image acquisition devices comprises a camera.

16. A computing device, comprising a memory, a processor and a computer program stored on the memory and run on the processor, wherein the processor, when executes the computer program, implements the method according to claim 1.

17. A non-transitory computer readable storage medium, on which a computer instruction is stored, wherein the computer instruction, when executed by a processor, performs the method according to claim 1.

18. A non-transitory computer program product comprising a computer program which, when executed by a processor, implements the method according to claim 1.

* * * * *